(12) United States Patent
McPherson

(10) Patent No.: US 10,534,117 B2
(45) Date of Patent: Jan. 14, 2020

(54) OPTICAL FILTERS AND METHODS FOR MAKING THE SAME

(71) Applicant: ENCHROMA, INC., Berkeley, CA (US)

(72) Inventor: Donald McPherson, Oakland, CA (US)

(73) Assignee: ENCHROMA, INC., Berkeley, CA (US)

(*) Notice: Subject to any disclaimer, the term of this patent is extended or adjusted under 35 U.S.C. 154(b) by 0 days.

(21) Appl. No.: 15/920,010

(22) Filed: Mar. 13, 2018

(65) Prior Publication Data

US 2018/0203171 A1 Jul. 19, 2018

Related U.S. Application Data

(63) Continuation of application No. PCT/US2016/051542, filed on Sep. 13, 2016.

(60) Provisional application No. 62/219,021, filed on Sep. 15, 2015.

(51) Int. Cl.
| | | |
|---|---|---|
| *D06P 5/00* | (2006.01) | |
| *G02B 5/22* | (2006.01) | |
| *D06P 3/00* | (2006.01) | |
| *D06P 3/24* | (2006.01) | |
| *G02B 1/04* | (2006.01) | |

(52) U.S. Cl.
CPC ............... *G02B 5/223* (2013.01); *D06P 3/00* (2013.01); *D06P 3/24* (2013.01); *G02B 1/04* (2013.01)

(58) Field of Classification Search
CPC ......... A61F 9/065; G02C 7/104; G02C 7/102; G02B 5/23; G02B 5/223
See application file for complete search history.

(56) References Cited

U.S. PATENT DOCUMENTS

| | | |
|---|---|---|
| 3,877,797 A | 4/1975 | Thornton, Jr. |
| 4,176,299 A | 11/1979 | Thornton, Jr. |
| 4,300,819 A | 11/1981 | Taylor |
| 4,826,286 A | 5/1989 | Thornton, Jr. |
| 5,270,854 A | 12/1993 | Lee et al. |
| 5,369,453 A | 11/1994 | Chen et al. |
| 5,408,278 A | 4/1995 | Christman |
| 5,646,781 A | 7/1997 | Johnson, Jr. |
| 5,774,202 A | 6/1998 | Abraham et al. |

(Continued)

FOREIGN PATENT DOCUMENTS

| | | |
|---|---|---|
| CN | 1165967 A | 11/1997 |
| CN | 101203777 A | 6/2008 |

(Continued)

OTHER PUBLICATIONS

ANSI Z80.3-2010; The Accredited Committee Z80 for Ophthalmic Standards; American Standard for Ophthalmics—Nonprescription Sunglass and Fashion Eyewear Requirements; Jun. 7, 2010; pp. 1-24 (34 pages.

(Continued)

*Primary Examiner* — Eisa B Elhilo
(74) *Attorney, Agent, or Firm* — Innovation Counsel LLP

(57) ABSTRACT

Described herein are optical filters that provide regulation and/or enhancement of chromatic and luminous aspects of the color appearance of light to human vision, and methods for designing and making the same. The filters have applications in ophthalmics, e.g., in prescription and nonprescription lenses.

24 Claims, 10 Drawing Sheets

(56) References Cited

U.S. PATENT DOCUMENTS

| | | | |
|---|---|---|---|
| 6,132,044 | A | 10/2000 | Sternbergh |
| 6,145,984 | A | 11/2000 | Farwig |
| 6,149,270 | A | 11/2000 | Hayashi |
| 6,450,652 | B1 | 9/2002 | Karpen |
| 7,106,509 | B2 | 9/2006 | Sharp |
| 7,284,856 | B2 | 10/2007 | Duha et al. |
| 7,393,100 | B2 | 7/2008 | Mertz |
| 7,506,977 | B1 | 3/2009 | Aiiso |
| 7,597,441 | B1 | 10/2009 | Farwig |
| 8,210,678 | B1 | 7/2012 | Farwig |
| 2002/0126256 | A1 | 9/2002 | Larson |
| 2004/0114242 | A1 | 6/2004 | Sharp |
| 2005/0224703 | A1 | 10/2005 | Harada et al. |
| 2006/0146275 | A1 | 7/2006 | Mertz |
| 2008/0212319 | A1 | 9/2008 | Klipstein |
| 2010/0179790 | A1 | 7/2010 | Nakauchi et al. |
| 2010/0182678 | A1 | 7/2010 | Southwell |
| 2011/0068698 | A1 | 3/2011 | Swoboda et al. |
| 2011/0255051 | A1 | 10/2011 | McCabe et al. |
| 2012/0206050 | A1 | 8/2012 | Spero |
| 2013/0100048 | A1* | 4/2013 | Harding .............. C08K 5/29 345/173 |
| 2013/0141693 | A1 | 6/2013 | McCabe et al. |
| 2013/0252000 | A1 | 9/2013 | Takiff et al. |
| 2014/0233105 | A1 | 8/2014 | Schmeder et al. |

FOREIGN PATENT DOCUMENTS

| | | |
|---|---|---|
| CN | 101690248 A | 3/2010 |
| EP | 0519660 A1 | 12/1992 |
| EP | 0939329 A1 | 9/1999 |
| EP | 1986024 A1 | 10/2008 |
| EP | 1340115 B1 | 5/2009 |
| JP | 2005511457 A | 4/2005 |
| JP | 2008282757 A | 11/2008 |
| WO | 95/05621 A1 | 2/1995 |
| WO | 02/42829 A1 | 5/2002 |
| WO | 02/094595 | 11/2002 |
| WO | 2006/071734 A2 | 7/2006 |
| WO | 2007094338 A1 | 8/2007 |
| WO | 2013/022744 A2 | 2/2013 |
| WO | 2015/179538 A1 | 11/2015 |
| WO | 2016/148984 A1 | 9/2016 |

OTHER PUBLICATIONS

British Standard BS EN 1836:2005, Technical Committee CEN/TC 85 "Eye-protective equipment" Personal eye equipment—Sunglasses and sunglare filters for general use and filters for direct observation of the sun; Sep. 2007; pp. 1-34 (46 pages).

Rea, M.S. et al., Color Rendering: Beyond Pride and Prejudice; Color Research and Application, Dec. 2010; pp. 401-409; vol. 35; No. 6, 2010 Wiley Periodical, Inc.

Drum, Bruce; FDA regulation of labeling and promotional claims in the therapeutic color vision devices; A tutorial, Visual Neuroscience (2004), 21; pp. 461-463.

Tilsch, Markus K., et al., Manufacturing of precision optical coatings; Chinese Optics Letters, vol. 8, Supplement; Apr. 30, 2010; pp. 38-43.

Moreland, Jack D., et al., Quantitative assessment of commercial filter 'aids' for red-green colour defectives; Ophthal. Physiol. Opt. 2010 30: No. 5; pp. 685-692.

Vorobyev, Misha, et al., Receptor noise as a determinant of colour thresholds; Proc. R. Soc. Lond. B (1998) 265; pp. 351-358.

Sharp, G.D., et al., Retarder Stack Technology for Color Manipulation; 1999 SID International Symposium Digest of Technical Papers; May 1999; pp. 1072-1075.

PCT/US2012/027790; filed Mar. 5, 2012; Written Opinion of the International Searching Authority and International Search Report; 20 pages; dated Jul. 27, 2012.

PCT/US2012/027790; filed Mar. 5, 2012; International Preliminary Report on Patentability (1 pg.) dated Sep. 3, 2013 and Written Opinion (14 pgs.); dated Jul. 27, 2012.

Kirkpatrick, S., et al., Optimization by Simulated Annealing; Science, vol. 22, No. 4598, May 13, 1983, pp. 671-680.

Linear Programming; Feb. 28, 2011 (Feb. 28, 2011); XP055027872; Retrieved from the Internet: [on May 23, 2012] URL: http://en/wikipedia.org/w/index.php?title=Linear_programming&oldid=416428507.

Swillam, Mohammed A., et al., Multilayer Optical Coatings Using Convex Optimization; Journal of Lightwave Technology, IEEE Service Center, New York, NY, US; vol. 25, No. 4, Apr. 1, 2007; pp. 1078-1085.

European Extended Search Report corresponding to EP 14165905. 2; Jan. 2015; 15 pages.

International Search Report corresponding to PCT/US2016/051542, dated Dec. 5, 2016, 1 page.

International Search Report corresponding to PCT/US2017/055200, dated Nov. 30, 2017, 1 page.

* cited by examiner

OPTICAL FILTERS AND METHODS FOR MAKING THE SAME

CROSS-REFERENCE TO RELATED APPLICATIONS

This application is a continuation of International Patent Application No. PCT/US2016/51542 titled "Optical Filters and Methods For Making the Same" and filed Sep. 13, 2016. PCT/US16/51542 claims benefit of priority to U.S. Provisional Patent Application No. 62/219,021 titled "Optical Filters and Methods For Making the Same" and filed Sep. 15, 2015. Each of these applications is incorporated by reference herein in its entirety.

This application is also related to PCT Patent Application No. PCT/US2012/027790, titled "Multi-Band Color Vision Filters and Method by LP-Optimization" and filed Mar. 5, 2012; to U.S. patent application Ser. No. 14/014,991, titled "Multi-Band Color Vision Filters and Method by LP-Optimization" and filed Aug. 30, 2013; and to U.S. Provisional Patent Application No. 62/133,207, titled "Optical Filters Affecting Color Vision in a Desired Manner and Design Method Thereof by Non-Linear Optimization" and filed Mar. 13, 2015; each of which is incorporated by reference herein in its entirety.

FIELD

Described herein optical filters and methods for making the same. The optical filters comprise tinted transparent polymeric substrates and have applications in ophthalmic devices, for example in ophthalmic lenses.

BACKGROUND

A need exists for improved optical filters that enhance color vision. For example, a need exists for improved ophthalmics that enhance color vision.

SUMMARY

Described herein are optical filters comprising tinted transparent polymeric substrates, methods for making the same, methods for designing the same, and systems for making the same. The optical filters have applications in ophthalmics, for example as tinted ophthalmic lenses that enhance color vision. Optionally, the tinted lenses may be prescription lenses.

In one aspect, optical filters are described where the optical filters comprise a transparent polymeric substrate and multiple dyes incorporated into the substrate, at least one of the dyes being a narrowband absorber dye. The substrate is capable of being sufficiently swelled by a solvent that dissolves the dyes and facilitates diffusion of the dyes into the substrate to tint the substrate. The substrate substantially recovers its original volume and shape following removal of the solvent, trapping the dyes in the substrate. The dyes and their relative amounts are selected so that the tinted substrate exhibits an absorption spectrum useful for enhancing color vision. In some variations, one or more narrowband absorber dyes used in an optical filter is substantially insoluble in water. In some variations, diffusion of the dyes into the substrate occurs at a temperature of about 60° C. or less, about 50° C. or less, about 40° C. or less, about 30° C. or less, about 25° C. or less, or about 20° C. or less.

The solvent may be a single solvent or may comprise a mixture of solvents. In some cases, the solvent is nonaqueous. In some variations, the solvent may comprise one or more nonpolar or weakly polar solvent components that is capable of dissolving the dyes and swelling the substrate to facilitate diffusion of the dyes into the substrate. For example, in some cases, the solvent may comprise a solvent component that has a dielectric constant of about 20 or less, or about 15 or less, or about 10 or less. In some cases, the solvent may comprise one or more solvent components that has a dielectric constant greater than 20. In some cases, the solvent comprises at least two miscible solvent components. For example, in some variations, the solvent may comprise methanol (having a dielectric constant of about 32.7) and dichloromethane (having a dielectric constant of 8.9). The solvent does not substantially degrade the surface or optical properties of the substrate. For example, the solvent does not crack, craze, strain, cloud, or discolor the substrate.

In some variations, the transparent polymeric substrate may comprise a polyurethane, for example a polyurethane-urea prepared by reaction of a polyurethane prepolymer with a diamine curing agent. A polyurethane-based substrate may comprise any suitable polyurethane, and in some cases, may comprise Trivex™ polyurethane.

In some variations, the transparent polymeric substrate may comprise a polymeric organosilicon compound, e.g., polydimethylsiloxane or a silicone-hydrogel. If the substrate comprises a silicone-hydrogel, it may be any suitable silicone hydrogel, and in some cases comprises balafilcon A.

In some variations, an optical filter may comprise more than one narrowband absorber dye. For example, an optical filter may comprise 2, 3, 4, 5, 6 or more narrowband absorber dyes.

At least one of the dyes used in an optical filter may, for example, be selected from the group consisting of narrowband absorber dyes having a reported peak absorbance in one or more solvents at about 400 nm, 407 nm, 409 nm, 415 nm, 419 nm, 420 nm, 425 nm, 430 nm, 439 nm, 454 nm, 454 nm, 455 nm, 456 nm, 462 nm, 473 nm, 491 nm, 510 nm, 511 nm, 526 nm, 527 nm, 574 nm, 584 nm, 594 nm, 626 nm, 642 nm, 643 nm, 654 nm, 659 nm, 667 nm, 668 nm, 670 nm, 677 nm, 693 nm, 694 nm, 705 nm, 732 nm, 735 nm, 742 nm, 751 nm, 752 nm, 761 nm and 762 nm.

In some variations, the optical filters comprise narrowband absorber dyes having peak absorbances of about 473 nanometers (nm), 491 nm, 574 nm, 584 nm, and 594 nm.

In some variations, the optical filter comprises narrowband absorber dyes having peak absorbances of about 473 nm, 491 nm, 574 nm, 584 nm, 594 nm, and 642 nm.

In some variations, the optical filter comprises narrowband absorber dyes having peak absorbances of about 473 nm, 491 nm, 574 nm, 584 nm, 594 nm, and 668 nm.

In some cases, an optical filter comprises a polyurethane-urea substrate and multiple narrowband absorber dyes.

In some cases, an optical filter comprises a silicone-hydrogel substrate and multiple narrowband absorber dyes.

The optical filters described herein may, for example, be configured for use as ophthalmic lenses, which may be either prescription or nonprescription ophthalmic lenses. In some cases, the ophthalmic lenses are adapted for use in eyeglasses. In some cases, the ophthalmic lenses are adapted for use in contact lenses.

Prescription or nonprescription ophthalmic lenses in which the polymeric substrate comprises a polyurethane-urea (e.g., Trivex™-based polymers) may be adapted for use in eyeglasses. Prescription or nonprescription ophthalmic lenses in which the polymeric substrate comprises a polymeric organosilicon compound (e.g., polydimethylsiloxane or a silicone-hydrogel) may be adapted for use in contact lens.

In some variations, the optical filters may be useful for treating protanomaly or deuteranomaly.

In some variations, the optical filters may be configured for use in a scope assembly, camera, window, optical coating, screen, or lamp assembly.

In another aspect, described herein are methods for making optical filters. The methods comprise: i) diffusing multiple dyes dissolved in a solvent into a transparent polymeric substrate at a tinting temperature, where at least one of dyes is a narrowband absorber dye; and ii) removing the solvent. The solvent is selected to sufficiently swell the polymeric substrate and to facilitate diffusion of the dyes into the substrate to tint the substrate. The substrate substantially recovers its original volume and shape following removal of the solvent, trapping the dyes in the substrate. The dyes and their relative amounts are selected so that the tinted substrate exhibits an absorption spectrum useful for enhancing color vision. In some variations of the methods, one or more narrowband absorber dyes used is substantially insoluble in water. In some variations of the methods, the diffusing of the dyes into the substrate occurs at a temperature of about 60° C. or less, about 50° C. or less, about 40° C. or less, about 30° C. or less, about 25° C. or less, or about 20° C. or less.

The solvent used in the methods may be a single solvent or may be a mixture of two or more solvents. In some cases, the solvent is nonaqueous. In some variations, the solvent may comprise one or more nonpolar or weakly polar solvent components that is capable of dissolving the dyes and swelling the substrate to facilitate diffusion of the dyes into the substrate. For example, in some cases, the solvent may comprise a solvent component that has a dielectric constant of about 20 or less, or about 15 or less, or about 10 or less. In some cases, the solvent may comprise one or more solvent components that has a dielectric constant greater than 20. In some cases, the solvent comprises at least two miscible solvent components. For example, in some variations, the solvent may comprise methanol (having a dielectric constant of about 32.7) and dichloromethane (having a dielectric constant of 8.9). The solvent does not substantially degrade the surface or optical properties of the substrate. For example, the solvent does not crack, craze, strain, cloud, or discolor the substrate.

In some cases, the methods comprise diffusing multiple narrowband absorber dyes into the substrate, e.g., 2, 3, 4, 5, 6, or more narrowband absorber dyes.

In some variations, the methods may comprise linearly combining a spectral profile of each dye in a weighted manner to obtain a desired absorption spectrum, and determining concentrations of each dye in the solvent to achieve the desired absorption spectrum at the tinting temperature in a tinting time based on: i) the weighted linear combination of spectral profiles and ii) individual concentration-dependent diffusion data for each dye obtained at the tinting temperature.

In some variations, at least one of the dyes is, for example, selected from the group consisting of narrowband absorber dyes having a reported peak absorbance in one or more solvents at about 400 nm, 407 nm, 409 nm, 415 nm, 419 nm, 420 nm, 425 nm, 430 nm, 439 nm, 454 nm, 454 nm, 455 nm, 456 nm, 462 nm, 473 nm, 491 nm, 510 nm, 511 nm, 526 nm, 527 nm, 574 nm, 584 nm, 594 nm, 626 nm, 642 nm, 643 nm, 654 nm, 659 nm, 667 nm, 668 nm, 670 nm, 677 nm, 693 nm, 694 nm, 705 nm, 732 nm, 735 nm, 742 nm, 751 nm, 752 nm, 761 nm and 762 nm. In some variations of the methods, narrowband absorber dyes having peak absorbances of about 473 nm, 491 nm, 574 nm, 584 nm, and 594 nm are diffused into the substrate.

In some variations of the methods, narrowband absorber dyes having peak absorbances of about 473 nm, 491 nm, 574 nm, 584 nm, 594 nm, and 642 nm are diffused into the substrate.

In some variations of the methods, narrowband absorber dyes having peak absorbances of about 473 nm, 491 nm, 574 nm, 584 nm, 594 nm, and 668 nm are diffused into the substrate.

In some variations of the methods, the polymeric substrate comprises a polyurethane, e.g., a polyurethane-urea. In some cases, the polyurethane-urea is made by reaction of a polyurethane prepolymer with a diamine curing agent, and in some cases, may comprise a Trivex™ polyurethane.

In some variations of the methods, the transparent polymeric substrate comprises a polymeric organosilicon, e.g., polydimethylsiloxane or a silicone-hydrogel. In some cases, the substrate comprises balafilcon A.

The diffusion of the dyes into the polymer may be conducted at a temperature sufficiently below a boiling point of any component of the solvent to reduce the rate of evaporation of that component to an acceptable level under the tinting conditions. In some cases, the tinting temperature may be about 60° C. or less, about 50° C. or less, about 40° C. or less, about 30° C. or less, about 25° C. or less, or about 20° C. or less.

Certain variations of the methods comprise: i) diffusing multiple dyes dissolved in a solvent into a transparent polyurethane substrate at a tinting temperature, at least one of the dyes being a narrowband absorber dye; and ii) removing the solvent. The solvent is selected to sufficiently swell the polymeric substrate and facilitates diffusion of the dyes into the substrate to tint the substrate. The substrate substantially recovers its original shape and volume following removal of the solvent, trapping the dyes in the substrate. The multiple dyes are selected so that the tinted substrate exhibits an absorption spectrum for enhancing color vision. In some cases, multiple narrowband absorber dyes are dissolved in the solvent and diffused into the substrate. In some cases, the solvent comprises methylene chloride. In some cases, the solvent comprises a mixture of methylene chloride and methanol.

Other variations of the methods comprise: i) diffusing multiple dyes dissolved in a solvent into a transparent polymeric organosilicon substrate at a tinting temperature, at least one of the dyes being a narrowband absorber dye; and ii) removing the solvent. The solvent is selected to sufficiently swell the polymeric substrate and to facilitate diffusion of the dyes into the substrate to tint the substrate. The substrate substantially recovers its original shape and volume following removal of the solvent, trapping the dyes in the substrate. The multiple dyes and their relative amounts are selected so that the tinted substrate exhibits an absorption spectrum for enhancing color vision. In some cases, multiple narrowband absorber dyes are dissolved in the solvent and diffused into the substrate. In some cases, the solvent comprises methylene chloride, or a mixture of methylene chloride and methanol.

In some variations of the methods, the transparent polymeric substrate comprises an ophthalmic lens, which may be a prescription ophthalmic lens or a nonprescription ophthalmic lens. In some cases, the methods may be adapted to make an ophthalmic lens for treating protanomaly. In some cases, the methods may be adapted to make an ophthalmic lens for treating deuteranomaly.

Some variations of the methods are adapted for making tinted polymeric substrates for use in scope assemblies, cameras, windows, optical coatings, screens, or lamp assemblies.

In another aspect, methods for making an optical filter comprise: i) diffusing identified dyes dissolved in a solvent into a transparent polymeric substrate at a tinting temperature for a tinting time t, at least one of the identified dyes being a narrowband absorber dye; and ii) removing the solvent. The solvent is selected to sufficiently swell the polymeric substrate to facilitate diffusion of the dyes into the substrate to tint the substrate. The substrate substantially recovers its original shape and volume following removal of the solvent, trapping the dyes in the substrate. The identified dyes have absorption peaks at or near absorption peaks in a target absorption spectrum, with narrowband absorbing dyes being selected for matching features in the target spectrum. A target peak optical density for each dye is determined using a weighted linear combination of individual absorption spectra of the identified dyes that substantially matches the target spectrum. The weight given to each individual absorption spectrum is used to determine the target peak optical density for that dye. The relationship $OD_\lambda(C_s, t) = BC_s t^{1/2}$ is used to determine the dye concentration $C_s$ for each dye in the solvent given its target peak optical density at wavelength $\lambda$ $OD_\lambda(C_s, t)$ and the tinting time t, where B represents an empirically-determined proportionality constant for each dye determined at the tinting temperature. The target absorption spectrum is selected to be useful for enhancing color vision. The methods may be used for making ophthalmic lenses, which may be prescription ophthalmic lenses or nonprescription lenses.

In another aspect, described herein are systems for making tinted ophthalmic lenses. The systems comprise: i) a transparent polymeric lens substrate; and ii) multiple dyes, at least one dye being a narrowband absorber dye. The solvent is capable of dissolving the dyes and capable of sufficiently swelling the polymeric lens substrate to facilitate diffusion of the dyes into the substrate to tint the substrate. The substrate substantially recovers its original shape and volume following removal of the solvent, trapping the dyes in the substrate. The dyes and their relative amounts are selected so that the tinted lens exhibits an absorption spectrum useful for enhancing color vision. Some systems comprise multiple narrowband absorber dyes, e.g., 2, 3, 4, 5, 6 or more multiple narrowband absorber dyes. In some variations of the systems, one or more narrowband absorber dyes is substantially insoluble in water. In some variations, diffusion of the dyes into the substrate occurs at a temperature of about 60° C. or less, about 50° C. or less, about 40° C. or less, about 30° C. or less, about 25° C. or less, or about 20° C. or less.

In some variations of the systems, the polymeric lens substrate comprises a polyurethane, e.g., a polyurethane-urea polymer. In other cases, the polymeric lens substrate comprises an organosilicon polymer, e.g., a polydimethylsiloxane or a silicone-hydrogel.

The solvent may be a single solvent or a mixture of solvents. In some systems, the solvent is nonaqueous. In some variations, the solvent may comprise a nonpolar or weakly polar solvent component that is capable of dissolving the dyes and swelling the substrate to facilitate diffusion of the dyes into the substrate. For example, in some cases, the solvent may comprise a solvent component that has a dielectric constant of about 20 or less, or about 15 or less, or about 10 or less. In some cases, the solvent may comprise one or more solvent components that has a dielectric constant greater than 20. In some cases, the solvent comprises at least two miscible solvent components. For example, in some variations, the solvent may comprise methanol (having a dielectric constant of about 32.7) and dichloromethane (having a dielectric constant of 8.9). The solvent does not substantially degrade the surface or optical properties of the substrate. For example, the solvent does not crack, craze, strain, cloud, or discolor the substrate. The solvent component included in the systems may comprise methylene chloride, or a mixture of methylene chloride and methanol in some cases.

In some variations of the systems, at least one of the absorber dyes is, for example, selected from the group consisting of narrowband absorber dyes having a peak absorbance at 400 nm, 407 nm, 409 nm, 415 nm, 419 nm, 420 nm, 425 nm, 430 nm, 439 nm, 454 nm, 454 nm, 455 nm, 456 nm, 462 nm, 473 nm, 491 nm, 510 nm, 511 nm, 526 nm, 527 nm, 574 nm, 584 nm, 594 nm, 626 nm, 642 nm, 643 nm, 654 nm, 659 nm, 667 nm, 668 nm, 670 nm, 677 nm, 693 nm, 694 nm, 705 nm, 732 nm, 735 nm, 742 nm, 751 nm, 752 nm, 761 nm and 762 nm.

The polymeric lens substrate included in the systems may be any polymeric lens suitable for the intended application. The polymeric lens may be a prescription lens or a nonprescription lens.

BRIEF DESCRIPTION OF THE DRAWINGS

FIG. 9-B shows spectral scan of Example 3A: Trivex™ lens held for 120 s in low-concentration tinting bath. Optical density is measured at wavelength of peak absorption.

FIG. 9-C shows spectral scan of Example 3A: Trivex™ lens held for 240 s in low-concentration tinting bath. Optical density is measured at wavelength of peak absorption.

FIG. 9-D shows spectral scan of Example 3A: Trivex™ lens held for 480 s in low-concentration tinting bath. Optical density is measured at wavelength of peak absorption.

FIG. 9-E shows spectral scan of Example 3B: Trivex™ lens held for 60 s in high-concentration tinting bath. Optical density is measured at wavelength of peak absorption.

FIG. 9-F shows spectral scan of Example 3B: Trivex™ lens held for 120 s in high-concentration tinting bath. Optical density is measured at wavelength of peak absorption.

FIG. 9-G shows spectral scan of Example 3B: Trivex™ lens held for 240 s in high-concentration tinting bath. Optical density is measured at wavelength of peak absorption.

FIG. 9-H shows spectral scan of Example 3B: Trivex™ lens held for 480 s in high-concentration tinting bath. Optical density is measured at wavelength of peak absorption.

DETAILED DESCRIPTION

Figure 1:
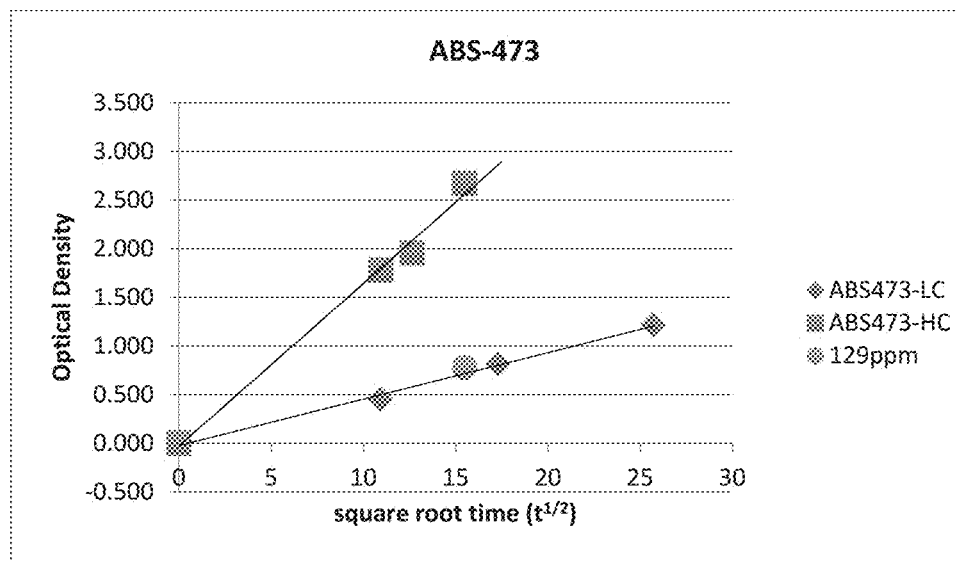
FIG. 1 shows optical density versus square root of time for Examples 1A-1B: tinting Trivex™-based lenses with Exciton ABS-473 in a 1:4 $CH_2Cl_2:CH_3OH$ solution with concentrations of 109 ppm (LC), and 443 ppm (HC). The point shown at 129 ppm (circle) is the calculated solution concentration needed to meet the design target of OD=0.89-0.91 at 473 nm, calculated using HC data.

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

Described herein are optical filters comprising tinted transparent polymeric substrates, methods for making the same, methods for designing the same, and systems for making the optical filters. The optical filters have applications in ophthalmics, for example as ophthalmic lenses that enhance color vision. Optionally, the lenses may be made according to a prescription, and the tinting methods may be used with polymeric prescription lens substrates without affecting the lens prescription.

Described herein are optical filters for use in enhancing color vision, methods for making the same, methods for designing the same, and systems for making the same. The optical filters comprise a transparent polymeric substrate and multiple dyes incorporated into the surface of the substrate. At least one of the dyes incorporated into the substrate is a narrowband absorber dye. The use of one of more narrowband absorber dyes allows for fine tuning of spectral characteristics of the optical filters. The substrate is capable of being sufficiently swelled by a solvent that dissolves the one or more dyes (including the one or more narrowband absorber dyes). The solvent that dissolves the dyes and swells the polymeric substrate facilitates diffusion of the dyes into the substrate. After diffusing the one or more dyes into the substrate to achieve desired spectral features, the solvent is removed, trapping the dyes in the substrate, and the substrate substantially recovers its original volume and shape. The solvent does not substantially degrade the surface or optical properties of the substrate. For example, the solvent does not crack, craze, cloud, strain, or discolor the substrate. The dyes and their relative amounts are selected so that the tinted substrate exhibits an absorption spectrum useful for enhancing color vision. The optical filters may be used as polymeric ophthalmic lenses for enhancing color vision. Because the volume and shape of the lens is retained following the tinting process, the tinting process described herein is compatible with the use of polymeric prescription ophthalmic lenses. In some variations, at least one of the narrowband absorber dyes is substantially insoluble in water. In some variations, the solvent is nonaqueous. For the optical filters, methods and systems described herein, the combination of substrate, dyes and solvent may be selected so that the tinting may be carried out a temperature of about 60° C. or less, 50° C. or less, 40° C. or less, 30° C. or less, 25° C. or less, or 20° C. or less. Tinted ophthalmic lenses suitable for use in eyeglasses and in contact lenses are described.

Optical filters are devices exhibiting wavelength-selective transmission of light. Such filters may be configured to transform aspects of color appearance as seen by the human eye. Optical filters that improve or modify aspects of color vision may provide therapeutic benefit to persons with color vision deficiency, to persons with low-vision disorders and to persons with normal color vision. Optical filters may provide eye-protection from high-energy radiation in the ultra-violet, visible, and/or infrared regions. The optical filters affecting color vision and/or color appearance described herein may be used in a variety of applications, including eyewear, contact lenses, scope assemblies, cameras, windows, coatings, windows, screens, lamp assemblies. When the optical filters act to modify light received by the eye using a lens or shield disposed in front of the face or eye, the optical filters are generally referred to as ophthalmics, ophthalmic devices or ophthalmic systems.

Optical filters may be incorporated into eyewear to provide a variety of useful effects for assisting with color vision, in particular for providing better color vision to persons with color vision deficiency. Non-limiting optical filters and methods for making and designing optical filters are described in U.S. patent application Ser. No. 14/014,991 and 62/133,207, each of which is incorporated by reference herein in its entirety. Constraints for designing effective color filters for enhancing color vision include, for example, the chromaticity and/or luminosity bounds required on the appearance of any specified light source as seen through the filter. Improved filters for affecting color vision in a desired manner are those with one or more stop-band (notch) cutouts, and where the absolute magnitude of the slope at each band transition is as high as possible. This characteristic of the band transitions of such filters may also be described as being "sharp" or "narrow band width", or similar terms.

In the human population there are genetic variations causing the spectral position of the M-cone and L-cone in the eye to vary between individuals. Persons with increased overlap between the M-cone and L-cone absorbance are called red-green color blind, although it is more technically correct to refer to this condition as color vision deficiency (CVD). CVD is classified according to type (either an anomaly of the M-cone (deuteranomaly) or of the L-cone (protanomaly)) and according to the extent (corresponding to the amount of increased overlap, which can be mild, moderate, severe or total). For cases of CVD where the overlap is less than total, trichromatic vision is still functional, although may be significantly impaired. For a mild impairment the number of perceivable colors may drop to 100 thousand (10% of normal), while for a strong individual it may be as low as 10 thousand (1% of normal). Filters disclosed herein are generally found to be useful for enhancement of trichromatic vision, including that of normal trichromatic vision, as well as for most cases of anomalous trichromatic vision. The fundamental mechanism of how these filters modify color vision is that they selectively block light with wavelengths corresponding to locations where significant amount of overlap between the photopigment absorbance curves is found. In addition to red-green color blindness, other types of anomalous trichromatic vision include tritanomaly (a condition where S-cone function is deficient), general loss of chromatic sensitivity (a condition often experienced with low-vision complications such as retinitis pigmentosa and glaucoma), and incomplete achromatopsia (a condition related to severe dysfunction or nearly total lack of cone cells, but having functional rod cells, sometimes also called "day-blindness").

A substrate that is transparent in the visible wavelength region can be altered to tune its wavelength-selective transmission properties, which may be useful for a wide range of optical elements. For example, to tune the transmission of a material at a particular wavelength $T(\lambda)$, its wavelength-dependent reflection $R(\lambda)$, absorption $A(\lambda)$ and/or scattering $S(\lambda)$ of a transparent material can be altered according to Equation 1, where $I_o(\lambda)$ represents the original transmitted intensity of the light at wavelength $\lambda$:

$$T(\lambda)=I_0(\lambda)-(R(\lambda)+A(\lambda)+S(\lambda)). \quad \text{Eq. (1)}$$

For optical filters, especially those used in optical aids for the eye, it may be desirable to tune the reflection $R(\lambda)$ and/or absorption $A(\lambda)$ to adjust the transmission at a particular wavelength or range of wavelengths. Reflection is a surface phenomenon and may, for example, be in the form of a partial mirror or a dielectric stack. Absorption may, for example, be brought about by an absorber uniformly dispersed throughout the material or due to an absorber diffused into the surface of the material.

A pigmented polymeric optic, for example an ophthalmic lens, may be made by uniformly dispersing an absorber in a suitable substrate monomer, polymerizing the monomer, and molding or otherwise shaping the pigmented polymer to form the pigmented polymeric optic. To uniformly disperse an absorber into an optic, for example an ophthalmic lens, requires blending a pigment into a suitable substrate monomer that has sufficient pigment solubility. The blending process must be sufficient to thoroughly mix the pigment and create a uniform concentration profile. Molding of a lens comprising the pigmented polymer may be accomplished for example by casting or injection molding.

Traditional tinting of polymeric lenses is performed in an aqueous bath with concentrated dissolved dye at temperatures as high as permitted (typically 91-94 degrees Celsius). The tinting process is monitored at intervals by removing lenses, rinsing and measuring the absorption. Lens materials may behave differently, even within the same compositional class. Dyes used in aqueous tinting processes are organic and readily soluble in water. These dyes are generally broad-band absorbers which may limit the range of spectral modification to darkening the lens and/or shifting the lens' white point. However it is highly desirable to be able to 'sculpt' the spectra and/or to reproduce sharp features (e.g., sharp peaks or sharp transitions) for instance to selectively filter one or more narrow wavelength bands, while maintaining a neutral white point.

Described herein are improved tinted optical filters that may be, for example, be used as ophthalmic lenses. The tinting process described herein is compatible with the use of a polymeric prescription lens substrate without altering the prescription of the lens. To create a prescription, the lens thickness is non-uniform. For a plus prescription (e.g., to treat far-sightedness, or hyperopia), the lens' optical center is thicker than the lens' edge and for a minus prescription (e.g., to treat near-sightedness, or myopia), the lens' optical center is thinner than the lens' edge. The transmission of light through the lens as a function of wavelength will follow the Beer-Lambert law (Eq. 2), wherein transmittance $T(\lambda)$ is exponential with thickness (path length):

$$T(\lambda)=e^{-\alpha(\lambda)cx} \quad \text{Eq. 2}$$

where $\alpha(\lambda)$ is a wavelength-dependent linear absorption coefficient, c is concentration of absorbing species and x is path length through the material. If the desired absorption spectrum of a pigmented prescription lens is complex and/or within tight tolerances, varying thickness across the lens may present challenges.

Certain dyes are characterized by narrow-band absorption. The use of one or more narrowband absorber dyes in an optical filter facilitates fine tuning of the optical characteristics of the filter. Narrowband visible and near infrared (IR) absorber dyes absorb strongly over a narrow wavelength band in the visible to near IR region, i.e., between about 400 nm and about 800 nm. Narrowband dyes encompass any narrowband dyes that are available and have appropriate spectral characteristics for use in the filters. Narrowband dyes may, for example, exhibit an absorption spectrum with a full width at half-maximum (FWHM) of about 200 nm or less, about 190 nm or less, about 180 nm or less, about 170 nm or less, about 160 nm or less, about 150 nm or less, about 140 nm or less, about 130 nm or less, about 120 nm or less, about 110 nm or less, about 100 nm or less, about 90 nm or less, about 80 nm or less, about 70 nm or less, about 60 nm or less, about 50 nm or less, or about 40 nm or less, less. Many narrowband absorber dyes are based on proprietary organic chemical formulations. Non-limiting examples of narrowband absorber dyes are commercially available from vendors including Exciton, Inc. of Dayton Ohio, Crysta-Lyn Chemical Company of Binghampton N.Y., and Epolin, Inc. (Newark, N.J.). By combining narrowband absorber dyes, e.g., in a mixture, complex spectra can be created. In some cases, it may be desirable to combine one or more narrowband absorber dyes with standard dyes (e.g., dyes that are not narrowband absorbers) to create complex spectra. However certain narrowband absorber dyes may be immiscible with water, exhibit poor solubility in water, or be substantially insoluble in water, the standard solvent used in traditional tinting of ophthalmic lenses.

Heating a polymeric substrate to above its glass transition temperature ($T_g$) may allow large dye molecules such as narrowband absorbers to diffuse into the polymer's structure, where upon cooling the lens would recover, with the dye in the substrate. However, certain suitable polymeric substrates (e.g., polyurethane-based polymers, for example polyurethane-urea polymers such as Trivex™ lens material) may have a $T_g$ that is substantially higher than the boiling temperature of the carrier solvents useful for dissolving narrowband absorber dyes (see, for example, Table I listing solubility of select narrowband absorption dyes in organic solvents), which may make this approach difficult. The glass transition temperature $T_g$ of polycarbonate is about 147° C., $T_g$ of polymers made from CR-39™ are about 85° C. (estimate from PPG CR-39™ product bulletin, last revised Apr. 20, 2006), and $T_g$ for Trivex™-based polymers may depend on details of the polymerization (e.g., degree of crosslinking) and exact composition, but in some cases may be about 160° C. CR-39™ allyl diglycol carbonate monomer or diethlyene glycol bis (allyl carbonate) is used as a monomer to make thermoset plastics.

Another approach to open up the polymeric substrate to permit large dye molecules to diffuse into polymeric substrate structure is to expose the lens to a solvent that swells the polymer sufficiently to allow diffusion of the dye, but does not permanently alter the polymer (e.g., physically distort and/or change shape, size or volume, craze, crack, cloud, discolor, strain, and the like). Without being bound by theory, in effect, the $T_g$ is locally (at the surface) lowered to a desired process temperature. Through this approach, dye diffusion can still be accomplished at process temperatures at which the solvent volatility can be greatly reduced compared to processing at traditional tinting temperatures of greater than 90° C.

As described herein, in some cases a narrowband absorber dye may exhibit poor solubility in water, or be substantially insoluble in water. In some variations, the solvent may comprise one or more nonpolar or weakly polar solvent components that is capable of dissolving one or more narrowband absorber dyes that exhibits poor solubility in water and swelling the substrate to facilitate diffusion of the dyes into the substrate. For example, in some cases, the solvent may comprise a solvent component that has a dielectric constant of about 20 or less, or about 15 or less, or about 10 or less. In some cases, the solvent may comprise one or more solvent components that has a dielectric constant greater than 20. In some cases, the solvent comprises at least two miscible solvent components. For example, in some variations, the solvent may comprise methanol (having a dielectric constant of about 32.7) and dichloromethane (having a dielectric constant of 8.9). By choosing a suitable solvent for a polymeric substrate, diffusion of the large molecule narrowband absorber dye into the polymer can take place at a temperature substantially lower than the traditional tinting temperature of greater than 90° C. For example, the combination of substrate, solvent and dyes may be selected so that the solvent sufficiently swells the substrate to allow diffusion of the dyes into the substrate at a tinting temperature of about 60° C. or lower, about 50° C. or lower, about 40° C. or lower, about 30° C. or lower, about 25° C. or lower, about 20° C. or lower, or about 15° C. or lower. The diffusion of the dyes into the polymer may be conducted at a temperature sufficiently below a boiling point of any component of the solvent to reduce the rate of evaporation of that component to an acceptable level under the tinting conditions. In some cases, the tinting temperature may be at least about 10° C. or at least about 15° C. below the boiling point of the lowest boiling component of the solvent. For example, many narrowband absorber dyes exhibit high solubility in methylene chloride, in many cases the dye diffusion can be accomplished at process temperatures of about 25° C. or lower, about 20° C. or lower, or about 15° C. or lower.

Once a desired amount of dye is diffused into the polymeric substrate, the solvent can be removed using any suitable method, trapping the dyes in the substrate. For example, solvent may be allowed to evaporate under ambient conditions, or solvent may be driven off using heat and/or removed using reduced pressure. For example, when brought into contact with methylene chloride, polyurethane-urea (e.g. Trivex™ polymers) responds by swelling. Without being bound by theory, in effect the $T_g$ is locally (at the surface) lowered to the process temperature. By using process temperatures of ≤20° C., ≤25° C., ≤30° C., ≤40° C., ≤50° C., or ≤60° C., solvent volatility can be greatly reduced, while still maintaining dye diffusion. Once removed from the dye solution, polyurethane-urea (e.g., Trivex™ lens material) recovers to its original unswelled state without apparent structural or surface alteration or damage.

Therefore a diffusion process is described wherein large dye molecules can be transferred from a solvent bath into the surface structure of the polymeric substrate. At least one of the components of the solvent bath acts as solvent for the dye species, as a carrier of the dye species and acts to effectively lower the $T_g$ of the polymeric substrate to facilitate diffusion of the dye species into the lens at reduced temperatures. For example, a solvent bath comprising methylene chloride may be used to tint a Trivex™-based lens, where the methylene chloride in the solvent bath acts as a solvent for the dye species, and a carrier of the dye species, and as an energy source to effectively lower the $T_g$ of the Trivex™ material.

Diffusion of the dye species into the polymeric substrate is governed by Fick's second law, which for 1-dimensional diffusion can be represented by the following equation 3.

$$\eta(x,t)=\eta_0 \mathrm{erfc}(x/2\sqrt{(Dt)}) \quad \text{Eq. 3}$$

where η(x,t) is the concentration of dye diffused into the lens from the surface in contact with solvent with dye concentration $\eta_0$. The complimentary Gaussian error function (erfc) argument is distance (x) over the 'effective diffusion length' $2\sqrt{(Dt)}$, where D is the diffusion coefficient. Since the argument is unitless, D has units of length squared over time. Equation 3 can be represented by the first 2 terms of the Taylor series for the error function:

$$\eta(x,t) = \eta_0[1 - 2(x/2\sqrt{(Dt\pi)})]. \quad \text{Eq. 4}$$

Equation 4 shows that the diffusion proceeds as the square root of time.

Narrowband absorber dyes (e.g., those available from Exciton, Inc., Dayton, Ohio) are generally soluble in nonpolar solvents or weakly polar solvents, with certain of the dyes soluble in solvents such as methylene chloride, chloroform, ethylene glycol butyl ether, diethylene glycol butyl ether, methyl ethyl ketone, hexane, toluene, and acetone, and are weakly soluble in methanol and isopropyl alcohol. A measure of polarity is the relative permittivity $\varepsilon_r$, also referred to as the dielectric constant, and in general, the narrowband absorber dyes (e.g., those available from Exciton) are soluble in solvents having a dielectric constant of about 20 or less, or a dielectric constant of about 10 or less. However many nonpolar or weakly polar solvents also at least partially dissolve, etch, or otherwise damage many polymeric lens materials. This is particularly true with methylene chloride, which is so aggressive as a solvent that it can be used to weld certain polymeric materials together.

Water is highly polar and the solvents mentioned above that are effective solvents for narrowband absorber dyes (e.g., those available from Exciton) are non-polar or weakly polar, generally having dielectric constants that are about 20 or less. Table I summarizes these solvents and their relative permittivity. It can be seen that the solubility of certain Exciton dyes is high in methylene chloride and is undetectable in water.

TABLE I

Dielectric constant (relative permittivity, $\varepsilon_r$) for solvents of interest, some Exciton dyes of interest and their solubility in these solvents. $CH_2Cl_2$ is methylene chloride.

| Solvent | $CH_2Cl_2$ | Hexane | Toluene | Acetone | Methanol | $H_2O$ |
|---|---|---|---|---|---|---|
| $\varepsilon_r^1$ | 8.93 | 1.88 | 2.38 | 20.7 | 32.7 | 80.1 |
| Dye (Exciton dye numbers) | | | Solubility $(gm/L)^2$ | | | |
| ABS-473 | 16 | n.r.[3] | 14 | n.r. | n.r. | 0.00 |
| P-491 | 50 | n.r. | 45 | n.r. | 0.36 | 0.00 |
| ABS-574 | 28 | 7.5 | 2.8 | 0.46 | n.r. | 0.00 |
| ABS-584 | 5 | .5 | 1 | 0.3 | n.r. | 0.00 |
| ABS-594 | 10 | 13 | 25 | 12 | n.r. | 0.00 |
| ABS-626 | Very good | n.r. | n.r. | n.r. | n.r. | 0.00 |
| ABS-642 | n.r. | n.r. | 6 | n.r. | n.r. | 0.00 |

[1]Relative permittivity data from http://macro.lsu.edu/howto/solvents/Dielectric%20Constant%20.htm.,
[2]Dye solubility data obtained from Exciton datasheets for the named Exciton dyes, available at www.exciton.com.)
[3]n.r. = not reported Adding compounds with low permittivity to water or methanol does not measurably improve solubility of the Exciton dyes listed in Table I in water or methanol. The addition of fatty acids, changing the system pH, temperature and pressure also has little or no measurable effect on dye solubility in water or methanol. It is possible to use methanol as a solvent for the Exciton dyes in Table I, and to increase the solubility further with small additions of acetone up to 25% by weight, based on the total weight of solution. For a methanol-acetone solvent with more than 25% by weight acetone, lenses comprising CR-29™-based polymer or polycarbonate may be severely attacked by the solvent. However, the Exciton dyes in Table I are quite large molecules and they were not observed to diffuse from the methanol-acetone solution into the polymer matrix of the lens material under the conditions tested. Lens materials considered included CR-39™-based polymer and polycarbonate.

For the optical filters and methods for making the filters described herein, all three of following are considered in combination: the dyes, including at least one narrowband absorber dye, the polymeric substrate, and the solvent. The solvent is selected so that the dyes are soluble in useful amounts, and so that the substrate is swelled by the solvent to facilitate diffusion of the dyes into the substrate. After the solvent is removed, the substrate substantially recovers to its original volume and shape, trapping the dyes in the substrate. In addition, the solvent does not substantially damage the surface or optical quality of the substrate (e.g., the solvent does not crack, craze, strain, cloud or discolor the substrate). The solvent acts to swell the polymeric substrate sufficiently to facilitate diffusion of the dyes into the substrate at the tinting temperature, but does not permanently alter or damage the substrate. The solvent may be a single solvent, or the solvent may be a mixture of two or more solvents. In some cases, the solvent is an organic solvent. In some cases, the solvent comprises a relatively nonpolar solvent component, which may be more effective as a solvent for certain narrowband absorber dyes that exhibit good solubility in relatively nonpolar solvents. In some cases, the solvent used comprises a component having a dielectric constant of about 20 or less, about 15 or less, or about 10 or less. For example, a solvent may comprise methylene chloride which has a dielectric constant of about 9. In some cases, the solvent may comprise an active component that acts to sufficiently swell the substrate and facilitate diffusion of the dissolved dyes into the substrate, and a dilutive component that is miscible with the active component. In some cases, the narrowband absorber dyes may be at least slightly soluble in the dilutive component.

If the tinting solvent comprises a mixture of two or more solvent components, the relative amounts of each solvent component may be determined based on any applicable factors, with non-limiting examples including the solubility of the narrowband dyes or other dyes to be used in the tinting process in each of the solvent components, the ability of each of the solvent components to swell but not permanently damage the polymeric substrate, the miscibility of the solvent components with each other, and solvent component characteristics that may affect ease and desirability of use (e.g., vapor pressure, boiling point, toxicity, availability, stability, cost, and the like).

In some cases, the tinting solvent may comprise at least some methylene chloride, which is a good solvent for many narrowband dyes, e.g., narrowband dyes available from Exciton, Inc. as described herein. In some cases, the solvent may comprise only methylene chloride. In other cases, the solvent may comprise methylene chloride mixed with one or more additional solvent components. For example, methylene chloride may be mixed with one or more alcohols, with non-limiting examples of alcohols including methanol, ethanol, and propanol (n-propanol or isopropanol). In some cases, methylene chloride used in a tinting solvent may be a majority component of the solvent, and in other cases, methylene chloride may be only a minority component of a solvent mixture. In some cases, the amount of methylene chloride in a tinting solvent may be selected to be only a minimum quantity to dissolve the requisite concentration of dyes to achieve the desired spectrum, and the balance of the solvent mixture may comprise one or more dilutive solvents that is miscible with the methylene chloride and does not adversely affect the solubility of the dyes in the solvent mixture. In some variations, the amount of methylene chloride in a solvent (volume %, based on the total volume of solvent) may be about 0.1%, about 0.5%, about 1%, about 5%, about 10%, about 15%, about 20%, about 25%, about 30%, about 35%, about 40%, about 50%, about 55%, about 60%, about 65%, about 70%, about 75%, about 80%, about 85%, about 90%, or about 95%. In some cases, methylene chloride may comprise even less than 0.1% by volume of the total solvent, or even more than about 95% by volume of the total solvent.

For example, in some cases, the solvent may comprise a mixture of methanol and methylene chloride, where a ratio of the amount of methanol to methylene chloride (methanol: methylene chloride, measured on a volume:volume basis) may be about 0.1:1, about 0.2:1, about 0.3:1, about 0.4:1, about 0.5:1, about 0.6:1, about 0.7:1, about 0.8:1, about 0.9:1, about 1:1, about 1.2:1, about 1.5:1, about 2:1, about 3:1, about 4:1, about 5:1, about 6:1, about 7:1, about 8:1, about 9:1, about 10:1, about 12:1, about 15:1, about 20:1, about 24:1, about 30:1, about 35:1, about 40:1, about 45:1, about 50:1, about 60:1, about 70:1, about 80:1, about 90:1, about 100:1, about 200:1, about 500:1, or about 1000:1. In some cases, the vol:vol ratio methanol:methylene chloride may be even less than 0.1:1, or even greater than 1000:1. In some cases, methylene chloride may be used as a solvent with no added methanol. In some cases, the solvent may comprise methanol with no added methylene chloride. In some cases, the solvent may comprise only methanol.

In some cases, ultrasonics may be used to facilitate dissolving of the dyes/and or diffusion of the dyes into the polymeric substrate. For example, an ultrasonic bath may be used to initially dissolve one or more dyes (including one or more narrowband absorber dyes) into the solvent and/or an ultrasonic bath may be used during the tinting process to facilitate diffusion of the dyes into the polymeric substrate.

The combination of dyes, including at least one narrowband absorber dye, used in the tinted polymeric substrates may be selected based on the intended application. The particular combination and amount of each dye to be incorporated into the substrate via the solvent-facilitated diffusion process described herein may be determined so that a weighted linear combination of the absorption spectrum for each of the dyes in the polymeric substrate forms a complex absorption spectrum that is useful for enhancing color vision. Non-limiting examples of target complex absorption spectra that are useful for enhancing color vision are provided in U.S. patent application Ser. Nos. 14/014,991 and 62/133,207, each of which is incorporated by reference herein in its entirety. Any suitable number of dyes may be combined together to create the desired target spectrum. In some cases, only narrowband absorber dyes are used, and in some cases one or more traditional dyes or broadband absorber dyes is used in combination with the one or more narrowband absorber dyes. As described herein, the use of one or more narrowband absorber dyes allows reproduction of sharp features (e.g., sharp peaks and sharp transitions), and/or sculpting of the spectrum to more closely match the finer features of the target spectrum. Any suitable number of dyes may be used in a tinting solution to achieve the desired complex spectrum. For example, 2, 3, 4, 5, 6, 7, 8 or more dyes may be combined together. In some cases, 2, 3, 4, 5, 6, 7, or 8 narrowband absorber dyes are combined in a tinting solution to create an optical filter useful for enhancing color vision. As described in more detail below, the concentrations of each dye in a tinting solution may be determined based on a weighted linear combination of individual absorption spectra for each dye that matches a target spectrum, and the diffusion properties of each dye under the tinting conditions (type of substrate, temperature and time), using a standard diffusion model and empirically measured diffusion properties of the individual dyes for the substrate.

The dyes are selected so that once they are diffused into the polymeric substrate, they remain stable in the polymeric substrate. For example, the dyes may be selected to be large molecules that will remain stable within the polymeric substrate, or the dyes may be selected to have an interaction with the polymeric substrate so that they remain stable within the polymeric substrate. The dyes are also selected to be stable under heat, pressure, UV exposure and any other environmental factors that they may experience during manufacture of articles or during use.

At least one of the dyes used in an optical filter may, for example, be selected from the group consisting of narrowband absorber dyes having a reported peak absorbance in one or more solvents at about 400 nm, 407 nm, 409 nm, 415 nm, 419 nm, 420 nm, 425 nm, 430 nm, 439 nm, 454 nm, 454 nm, 455 nm, 456 nm, 462 nm, 473 nm, 491 nm, 510 nm, 511 nm, 526 nm, 527 nm, 574 nm, 584 nm, 594 nm, 626 nm, 642 nm, 643 nm, 654 nm, 659 nm, 667 nm, 668 nm, 670 nm, 677 nm, 693 nm, 694 nm, 705 nm, 732 nm, 735 nm, 742 nm, 751 nm, 752 nm, 761 nm and 762 nm. Any combination of two or more of the narrowband absorber dyes may be used in the filters. In some cases, an optical filter comprises narrowband absorber dyes have peak absorbances of 473 nm, 491 nm, 574 nm, 584 nm, 594 nm, and 642 nm. In some cases, an optical filter comprises narrowband absorber dyes having peak absorbances of 473 nm, 491 nm, 574 nm, 584 nm, 594 nm and 668 nm.

In some variations, the optical filters comprise narrowband absorber dyes having peak absorbances of about 473 nm, 491 nm, 574 nm, 584 nm, and 594 nm. In some variations, the optical filters comprise narrowband absorber dyes having peak absorbances of about 473 nm, 491 nm, 574 nm, 584 nm, 594 nm, and 626 nm. In some variations, the optical filters comprise narrowband absorber dyes having peak absorbances of about 473 nm, 491 nm, 574 nm, 584 nm, 594 nm, and 642 nm. In some variations, the optical filters comprise narrowband absorber dyes having peak absorbances of about 473 nm, 491 nm, 574 nm, 584 nm, 594 nm, and 668 nm.

Non-limiting examples of narrowband absorber dyes that may be used to build absorption characteristics in optical filters that are useful for enhancing color vision may, for example, include any one of or any combination of ABS 400, ABS 407, ABS 409, ABS 415, ABS 419, ABS 420, ABS 425, ABS 430, ABS 439, ABS 454, ABS 454F, ABS 455, ABS 456, ABS 462, ABS 473, P491, ABS 510, ABS 511, ABS 526N, ABS 527, ABS 574, ABS 584, ABS 594, ABS 626, ABS 642, ABS 643, ABS 654, ABS 659, ABS 667, ABS 668, ABS670T, IRA 677, ABS 693N, ABS 694, IRA 705, IRA 732, IRA 735, IRA 742, IRA 751, IRA 752, IRA 761 AND IRA 762, all available from Exciton, Inc. (Dayton, Ohio).

Some variations of the optical filters may comprise a combination of two or more of ABS 473, ABS 491, ABS 574, ABS 584, ABS 594, ABS 626, ABS 642 and ABS 668, all available from Exciton, Inc. Some variations of the optical filters may comprise a combination of ABS 473, ABS 491, ABS 574, ABS 584, and ABS 594, all available from Exciton, Inc. Some variations of the optical filters may comprise a combination of ABS 473, ABS 491, ABS 574, ABS 584, ABS 594, and ABS 626, all available from Exciton, Inc. Some variations of the optical filters may comprise a combination of ABS 473, ABS 491, ABS 574, ABS 584, ABS 594, and ABS 642, all available from Exciton, Inc. Some variations of the optical filters may comprise a combination of ABS 473, ABS 491, ABS 574, ABS 584, ABS 594, and ABS 668, all available from Exciton, Inc.

Dyes used in tinted contact lenses are non-toxic and not soluble in aqueous solutions so that the dye will not transfer from the contact lens to the eye. Therefore, the dyes used in contact lenses, including narrowband absorber dyes used in the tinting baths described herein, may be selected to be nontoxic and insoluble in aqueous solution, as measured by applicable industry standards and applicable government safety regulations for contact lenses (e.g. the US Food and Drug Administration). According to Material Safety Datasheets and technical datasheets available from Exciton, Inc., visible and near IR wavelength absorbing Exciton dyes described herein are non-toxic and their solubility in aqueous solutions is below detection, making them suitable candidate dyes for use in tinting contact lenses useful for enhancing color vision.

In some cases optically clear polyurethanes are suitable for tinting using low permittivity solvents in which certain Exciton narrowband absorber dyes exhibit a high degree of solubility. For example, polyurethane-urea (e.g., Trivex™ lens material, PPG Industries, Pittsburg, Pa.) is suitable for tinting using low permittivity solvents that dissolve narrowband absorber dyes (for example, Exciton narrowband absorber dyes). As described herein, Trivex™-based polymers are copolymers of polyurethane and urea, and exhibit an ability to swell and contract with excellent dimensional recovery.

In some variations, optically clear polyurethanes useful as polymeric substrates may comprise polyurethanes enriched with urea (polyurethane-urea or polyurethane-polyurea) polymers. Such polymers may be prepared by reaction of a polyurethane prepolymer with a diamine curing agent, for example polymers sold under the tradename Trivex™ by PPG Industries, Inc. For example, polymers as described in U.S. Pat. No. 6,127,505, with reference to the description at column 2, line 29 through column 9 line 60, may be used. U.S. Pat. No. 6,127,505 is incorporated by reference herein in its entirety. For example, in some variations, a polyurethane suitable for use a polymeric substrate as described herein is prepared from aliphatic or cycloaliphatic diisocyanates, OH-containing intermediates, and aromatic diamine curing agents, as described in U.S. Pat. No. 6,127,505. For example, in some variations, a polyurethane suitable for a polymeric substrate as described herein may be prepared by reacting: 1) a polyurethane prepolymer prepared by reacting an aliphatic or cycloaliphatic diisocyanate with at least one —OH containing intermediate having a weight average molecular weight from about 400 to about 2000 and selected from the group consisting of polyester glycols, polycaprolactone glycols, polyether glycols, polycarbonate glycols, and mixtures thereof in an equivalent ratio of about 2.5 to 4.0 NCO/1.0 OH; and 2) at least one aromatic diamine curing agent selected from the group consisting of 2,4-diamino-3,5-diethyltoluene, 2,6-diamino-3,5-diethyltoluene, and mixtures thereof in an equivalent ratio of about 0.85 to about 1.02 $NH_2$/1.0 NCO, as described in U.S. Pat. No. 6,127,505, which is incorporated by reference herein in its entirety. Additional non-limiting examples of optically clear polyurethanes that may be useful as polymeric substrates suitable for tinting with narrowband absorber dyes as described herein include those described in U.S. Pat. Nos. 5,962,617 and 6,939,939, each of which is incorporated by reference herein in its entirety.

Variations of lenses comprising Trivex™-based polymers exist, with non-limiting examples including Trilogy™ Trivex™-based lenses, available from Younger Optics (Torrance, Calif.), Phoenix Trivex™-based lenses, available from Hoya Vision Care North America (Lewisville, Tex.), Augen Optics Trivex™ lenses (San Diego, Calif.), Excelite TVX Trivex™ lenses from Thai Optical Group (Bangbuathong, Nonthaburi 11110—Thailand), Aris™ Trivex™ lenses from X-Cel Optical Co. (Sauk Rapids, Minn.), Trexa™ Trivex™-based lenses from Essilor International (Charenton-le-Pont, France), SEIKO Trivex™-based lenses from SEIKO Optical Products Co. (Tokyo, Japan), Trivex™-based lenses from Shamir Optical Industry Ltd. (Kibbutz Shamir, Israel), Trivex™-based lenses from Shore Lens Co. (Northvale, N.J.), and Trivex™-based lenses from Signet Armorlite (San Marcos, Calif.).

Optically clear polyurethane-ureas prepared by the reaction of polyurethane prepolymer with a diamine curing agent (e.g., Trivex™-based polyurethanes) are lens materials that are robust when exposed to most chemicals and solvents, including methylene chloride ($CH_2Cl_2$). When polyurethane-urea polymer (e.g., Trivex™ lens material) is exposed to $CH_2Cl_2$, its surface swells, which in turn permits diffusion of dyes into the surface. Exciton absorber dyes are highly soluble in $CH_2Cl_2$ so that a system comprising a narrowband absorber dye (e.g., an Exciton absorber dye), $CH_2Cl_2$, and polyurethane-urea substrate (e.g., Trivex™-based polymer) may be used to diffuse the Exciton absorber dyes into the polyurethane substrate to tint the substrate, which may in some cases be ophthalmic lenses.

While not being bound by theory, when in contact with $CH_2Cl_2$ the polyurethane surface experiences a lowering of the effective glass transition temperature, $T_g$, opening up the structure allowing the dye molecules to diffuse in. Without being bound by theory, dye molecules moving from the dye rich solvent to the dye free polymeric substrate is thermodynamically favorable due to the chemical potential difference $\Delta\mu_i$, which creates an electrical potential.

A polymeric substrate for the optical filter is selected based on its intended application. For example, for optical filters to be used for ophthalmic lenses, the polymeric substrate may be selected based on whether it will be used for eyeglasses or for contact lenses, and whether it will be used for prescription lenses or nonprescription lenses. For eyeglasses, the polymeric substrate may be based on the strength of the prescription, whether the eyeglasses will be designated as safety glasses, used in sports, and the like. For use in eyeglasses, the polymeric substrate is desired to exhibit the following attributes: optically transparent, good optical properties, low density, impact resistance, dimensional stability, chemical resistance, fracture, chip and crack resistance, heat resistance, and UV blocking. If the tinted polymeric substrate is to be used as a contact lens, the substrate may be selected to be flexible, optically transparent, chemically resistant, biocompatible, and gas permeable.

For example, to make a lens in which a prescription outside of the range of about 3.00 D to −3.00 D (D=diopter), it may be desirable to use a polymeric substrate having a higher index of refraction than polyurethane-urea polymers (e.g., Trivex™ lens material). The index of refraction of Trilogy™ Trivex™-based polyurethane is 1.53 (see http://youngeroptics.com/pdf/trilogy/Trilogy_Monograph.pdf, available at www.youngeroptics.com). If a higher index of refraction is required, a polymeric substrate (e.g., a polyurethane or polyurethane-urea) comprising sulfur may be used. In some cases, a polymeric substrate may for example comprise a polymer made from Tribrid™ lens material, available from PPG Industries, Inc. (Pittsburgh, Pa.), which has an index of refraction of 1.60.

A polymeric substrate is selected to exhibit good optics, which is a catch-all industry term for lens materials known for having good optical characteristics. These include: A. Low chromatic dispersion (high Abbe value); B. Low inherent material stress, which may be accomplished using a material that is not injection-molded; and C. Stable surface curvatures, e.g., high resistance to circumferential deformation.

A polymeric substrate may exhibit low density (e.g., a density equal to or less than that of optical grade polycarbonate) so that the lens is lightweight or ultra-lightweight. For example, a desirable polymeric substrate may have a density of about 1.25 g/cm$^3$ or less, about 1.22 g/cm$^3$ or less, about 1.2 g/cm$^3$ or less, about 1.15 g/cm$^3$ or less, about 1.12 g/cm$^2$ or less, or about 1.11 g/cm$^3$ or less.

A polymeric substrate may be impact resistant. For applications as eyeglass lenses, the polymeric substrate may be capable of meeting or exceeding the US Food and Drug Administration (FDA) minimum impact standard for street/dress eyewear. The FDA minimum impact standard is described in 21 CFR 801.410(d)(2) and is commonly called the drop ball or impact test. 21 CFR 801.410 is incorporated by reference herein in its entirety, particularly with respect to the use of impact resistant lenses in eyeglasses and sunglasses. Since the FDA minimum impact standard is about 40 years old, the polymeric substrate may exceed the FDA minimum impact standard by at least about 10 times, at least about 20 times, at least about 30 times, at least about 40 times, at least about 50 times, at least about 60 times, or by an even larger margin.

A polymeric substrate may exhibit dimensional stability under typical use conditions. For example, a polymeric substrate may exhibit an ability to deform and recover to its original shape, resist shrinkage, resist warping even under unbalanced forces, unbalanced stresses, or uneven pressures, and resist cracking from long term compression, e.g., fractures such as radial fractures that result from lenses being mounted too tightly in frames.

A polymeric substrate may exhibit chemical resistance under typical use conditions. For example, a polymeric substrate may be resistant to common home and office solvents, such as ammonia, nail polish remover (acetone), and be resistant to edge cracking from solvent attack from the more secure and long-lasting thread lock liquids used to retain eye wire screws. Chemical resistance may be measured using any suitable method or applicable industry standard. In some cases, chemical resistance is measured according to ISO 175, e.g., ISO 175:2010 published in 2010, put forth by the International Organization for Standardization (ISO) and titled "Plastics—Methods of test for the determination of the effects of immersion in liquid chemicals" which is incorporated by reference herein in its entirety. ISO 175 is a standard in which the solvent resistance of polymeric materials is tested by immersing a set of samples in a set of solvents for a specified period of time at a specified temperature, and monitoring the samples for degradation by the solvents. Non-limiting examples of degradation that would indicate a lack of solvent resistance include a chemical reaction between the polymer and the solvent, and the dissolving of the polymer by the solvent. Evidence of a lack of solvent resistance may include an irreversible change in size or shape, warping, an irreversible change in mass, degradation of surface quality, crazing, cracking, strain, clouding, and discoloration.

The polymeric substrate may be fracture, chip and crack resistant, particularly for applications as lenses which are used in frames with exposed lens edges, such as nylon string mounts.

The polymeric substrate may be heat resistant to temperatures the lens is likely to experience during manufacture or use. For example, the polymeric substrate should be heat resistant that accidental exposure to high temperatures, such as those found within a closed car during the hot months of the year (e.g., July and August in the Northern Hemisphere), will not affect the substrate. If used in an application that requires hard coat or another high temperature processing step, the polymeric substrate should be resistant to material deflection brought on by temperatures experienced during a hard coat curing process, which can reach temperatures over 130° C. (266 degrees F.) and can result in optical distortions of the finished lens.

The polymeric substrate may offer UV protection that meets or exceeds the applicable standard for the application, for example ANSI standard ANSI Z80.3-2010, published by the American National Standards Institute, and titled "Ophthalmics—Nonprescription Sunglass Fashion Eyewear Requirements", which is incorporated by reference herein in its entirety. In some cases, the polymeric substrate may block 99-100% of UVB rays (280 nm to 315 nm). In some cases, the polymeric substrate may block 99-100% of UVA rays (315 nm to 380 nm). In some cases, the polymeric substrate may block 99-100% of both UVA and UVB rays.

In some cases, the polymeric substrate may comprise a polyurethane-urea, such as a Trivex™ polyurethane-urea. According to http://www.uccs.edu/~rtirado/PES_1600_SolarEnergy/trivex_lens.pdf, Trivex™ lenses exhibit superior optical properties, are not injection-molded, exhibit high resistance to circumferential deformation, are low density, 1.11 g/cm$^3$, exceed the FDA minimum impact standard for street/dress eyewear by a factor of 60 times, exhibit dimensional stability and an ability to both deform and return to its original shape and size, exhibit high resistance to shrinkage, resist warping, resistant to cracking from long-term compression, excellent resistance to common home and office solvents, such as ammonia or nail polish remover (acetone). Trivex™ lenses are also resistant to material deflection brought on by the higher temperatures encountered during hard coat curing processes. These temperatures can reach over 266 degrees F. and can result in optical distortions of the finished lens. Trivex™ lenses offers UV protection, blocking 100 percent of UV rays all the way to 395 nanometers, well beyond ANSI standards. Trivex™-based polymeric lens substrates can be purchased without hard coating, or they can arrive with a hard coat, which can be removed using known techniques.

Silicone shares some characteristics with polyurethane-urea lens substrates (e.g., Trivex™ lens material) in that when brought into contact with strong solvents silicone swells and when the solvent is removed the silicone recovers elastically without degradation.

Silicone-hydrogels may swell with one or more organic solvents that may dissolve one or more narrowband absorber dyes as described herein. Non-limiting examples of solvents that may be used to swell silicone-hydrogels are provided in U.S. Pat. No. 8,529,057, which is incorporated by reference herein in its entirety. The solvent causes surface swelling and opens the material up for penetration. A solvent may be selected that is capable of dissolving a set of dyes and to reversibly swell a contact lens substrate (e.g., a polysiloxane silicone or silicone-hydrogel) so that the dyes dissolved in the solvent are diffused into the substrate and remain trapped in the substrate after the solvent is removed, and the substrate substantially recovers its original shape, and volume after the solvent is removed. The solvent does not substantially degrade the surface or optical properties of the substrate. For example, the solvent does not crack, craze, strain, cloud, or discolor the substrate.

Polymeric substrates for use in contact lenses may be an organosilicon polymer, e.g., polydimethylsiloxane or a silicone-hydrogel. The substrate material may be selected to make rigid polymeric gas permeable contact lenses or soft contact gas permeable contact lenses. Further properties of the substrate may be selected based on the application (e.g., whether the contact lens will be daily wear or extended wear) and on the strength and type of prescription. Contact lens substrates should exhibit tear resistance, flexibility, oxygen permeability, wettability, and a resistance to protein deposition formation. In some cases, a contact lens substrate comprises a moderate water content (about 15-60%), an oxygen transmissiblity sufficient to avoid corneol edema (e.g., an oxygen transmissibility equal to or greater than about $24 \times 10^{-9}$ (cm-ml $O_2$)/(sec-ml-mmHg), a tear strength greater than about 1.0 g/mm$^2$, and a percent elongation greater than or equal to about 80%).

Bausch & Lomb PureVision™ (balafilcon A) has a water content of about 36% and an oxygen permeability Dk of about 100 barrers (1 barrer=$10^{-11}$ (cm$^3$ $O_2$(STP)-cm)/(cm$^2$-sec-mmHg)) (see Bausch & Lomb PureVision™2 package insert/fitting guide, available at www.bausch.com). Balafilcon A is a copolymer of a silicone vinyl carbamate, N-vinyl-prryolidone, a siloxane cross-linker and a vinyl alanine wetting monomer. Balafilcon A, is made by the copolymerization of at least two monomers, one of which is Tris (trimethylsiloxy)-silylpropyl vinyl carbamate monomer or TRIS-VC (a silicone vinyl carbamate monomer), and one of which is the hydrophilic hydrogel monomer N-vinyl pyrrolidone (NVP).

For selecting the particular combination of dyes to be used in tinting lenses according to the methods described herein, a target complex absorption spectrum is selected based on intended application. Non-limiting examples of certain target complex absorption spectra for treating certain types of color vision deficiencies and enhancing color vision in specified situations are provided in U.S. patent application Ser. No. 14/014,991 and 62/133,207, each of which is incorporated by reference herein in its entirety. The target spectrum may be realized in the polymeric substrate at a given tinting temperature and tinting time using: the absorption spectrum of each individual dye in the polymeric substrate or in an environment that closely approximates the substrate; a standard one-dimensional Fickian diffusion model that says that the peak OD achieved in the substrate varies with the square root of the tinting time; and empirically obtained concentration-dependent diffusion data of the individual dyes into the substrate obtained at the tinting temperature.

A method of realizing a target spectrum in a substrate by diffusing dyes is described as follows. First, dyes having absorption peaks at or near the absorption peaks in the target spectrum are identified. At least one of the dyes is a narrowband absorber dyes, with one or more narrowband absorbing dyes being selected for matching features in the target spectrum. In some cases, multiple ones of the dyes are narrowband absorber dyes. Then, absorption spectra of the individual representative dyes are measured in the polymeric substrate, or in a solvent or host in which the absorption spectrum is expected to closely match that of the polymeric substrate. A weighted linear combination of the individual absorption spectra is arrived at to match the target complex spectrum.

The optical filters may be made by i) diffusing the identified dyes dissolved in a solvent into a transparent polymeric substrate for a tinting time t; and removing the solvent, trapping the dyes in the substrate. The solvent is selected to sufficiently swell the polymeric substrate to facilitate diffusion of the dyes into the substrate to tint the substrate and so that the substrate substantially recovers its original shape and volume following removal of the solvent, trapping the dyes in the substrate. A target peak optical density for each dye is determined using a weighted linear combination of individual absorption spectra of the identified dyes that substantially matches the target spectrum, where the weight given to each individual absorption spectrum is used to determine the target peak optical density for that dye. The relationship $OD_\lambda(C_s,t)=BC_s t^{1/2}$ is used to determine the dye concentration $C_s$ for each dye in the solvent given its target peak optical density at wavelength $\lambda$ $OD_\lambda(C_s,t)$ and a tinting time t, where B represents an empirically-determined proportionality constant for each dye, obtained at the same temperature at which the tinting takes place.

The target absorption spectrum may be selected to be useful for enhancing color vision, e.g., for treating protanamolaly or deuteranomaly. For example, protanomalous individuals experience a reduced sensitivity to long-wavelength visible light (i.e. red light), and protanomalous individuals experience a lower wavelength of unique yellow whereas deuteranomalous individuals experience a longer wavelength of unique yellow and a higher sensitivity to longer wavelengths of light. The luminous transmittance of a lens may be selected based on its intended application. For example, a lens that is intended to be used in sunglasses may have a luminous transmittance of less than about 40%, and a lens that is intended to be used for lower ambient light environments may have a luminous transmittance that is higher. As described in U.S. patent application Ser. No. 14/014,991 and 62/133,207, optimized formulas for optical filters where the corresponding optimized filters provide strong color-enhancement effects and a desired luminous transmittance appropriate for incorporation may be produced using a gamut-area based performance metric. For example, a performance metric may be defined as the area enclosed by a set of chromaticity coordinates corresponding to a set of reference colors as seen through the filter, and the reference colors correspond to the Munsell color swatches used in the Farnsworth D-15 cap arrangement test. In some variations, the target white-point corresponds to a chroma of less than 2 according to the Munsell color system.

EXAMPLES

For the following Examples, Trivex™-based Trilogy™ lenses were sourced from Younger Optical, Inc. (Torrance, Calif.). In the initial study, Trivex™-based Trilogy™ lenses sourced from Younger Optical have a hard coat, which needs to be removed to allow dye diffusion. Younger recommends a procedure for removing the hard coat, available at http://www.youngeroptics.com/pdf/triology/Tril_Proc_Guide_Remove_Hardcoat.pdf. The hard coating was removed by this procedure, which comprises mounting the lens in a stainless steel holder and immersing in a tank of 10% solution KOH by weight at 55° C., with ultrasonics for 8 minutes, rinsing the lens in a second tank of deionized water for 1 minute with agitation, rinsing the lens in a third tank of deionized water for 1 minute with agitation, and cleaning the lens with isopropyl alcohol. Lenses were stored in a convection oven until needed.

Examples 1A-8A: Diffusion of Narrowband Absorber Dyes into a Polymeric Substrate To create certain useful products for treating deficiencies in color perception, more than one narrowband absorber dyes can be combined so that a composite absorption spectrum is obtained. Candidate dyes were evaluated, based on strength, stability and spectral profile. The dyes listed in Table II were selected for diffusion studies in the Trivex™-based lenses for tinting the lenses:

TABLE II

Exciton dye species' peak wavelength, absorption strength and solar stability. Data provided by Exciton or Exciton datasheets for the named dyes, available at www.exciton.com.

| Example | Dye species | $\lambda_{pk}$ (nm)[1] | Strength[2] (L/gm cm) | Solar Stability |
|---|---|---|---|---|
| 1A-1B | ABS-473 | 473 | 175 | Good |
| 2A-2C | P491 | 492 | >285 | excellent |
| 3A-3B | ABS-574 | 574 | 183 | very good |
| 4A | ABS-584 | 583 | 190 | excellent |
| 5A-5B | ABS-594 | 594 | 170 | excellent |
| 6A-6B | ABS-626 | 632 | >165 | very good |
| 7A-7B | ABS-642 | 642 | >185 | excellent |
| 8A | ABS-668 | 667 | >300 | excellent |

[1] All values are measured in $CH_2Cl_2$, except ABS-668, which is measured in chloroform.
[2] All values are measured in $CH_2Cl_2$, except ABS-626 and ABS-642, which are measured in methanol, and ABS-668, which is measured in chloroform.

Creation of Master Batch

Dye was weighed to 1 mg accuracy and dissolved in a 800 ml Pyrex beaker with 132.7 g $CH_2Cl_2$. This solution was mixed thoroughly and diluted to 500 ml with 316.7 g $CH_3OH$. This master solution was magnetically stirred for 30 minutes covered with a watch glass.

Preparation of Tinted Lenses

Dye solutions were made at low concentration (LC), high concentration (HC) and ultra-high concentration (UHC). The LC dye solution was made first, lenses tinted, and additional dye added to make subsequently more saturated solutions, with 30 minutes of stirring to fully dissolve the added dye.

The Trivex™-based Trilogy™ lenses that were stripped of their hard coat and dried were mounted in stainless steel lens holders (Bithler/Leybold), and immersed into the dye solution at a known temperature (20-22° C.) for a prescribed time from 60 to 600 seconds. After tinting, the mounted lenses were hung in a circulating oven at 40-50° C. for a minimum of 10 minutes. After drying, lenses were inspected for defects, and defects noted.

Spectra of the tinted lenses were collected on a Cary 5E spectrophotometer. An uncoated, untinted Trivex™-based Trilogy™ lens was used to establish a baseline. Absorbance was measured from 400 nm to 700 nm. Optical density was noted at the wavelength of peak absorbance. For Examples 1A-8A and FIGS. 1-8, the concentrations of dye in solution are provided in parts per million (ppm), based on total weight of dye and solution.

FIG. 1 shows the peak optical density for Trilogy™ Trivex™-based lenses tinted with Exciton ABS-473 in a 1:4 $CH_2Cl_2$:$CH_3OH$ (vol:vol) solution at two different concentrations. Example 1A (diamonds) was tinted with a concentration of 109 ppm dye in solution (LC) and Example 1B (squares) was tinted with a concentration of 443 ppm (HC). A concentration of 129 ppm dye (circle) in solution is calculated to yield the target OD for ABS-473 dye in the fully-loaded test (see Table V-A).

Figure 2:
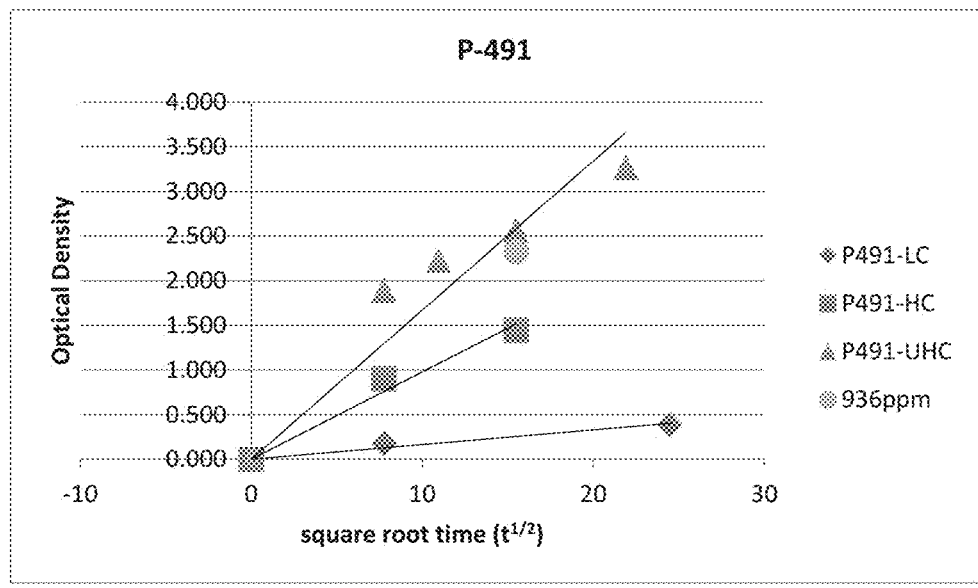
FIG. 2 shows optical density versus square root of time for Examples 2A-2C: tinting Trivex™-based lenses with Exciton P-491 in a 1:4 $CH_2Cl_2:CH_3OH$ solution with concentrations of 114 ppm (LC), 559 ppm (HC), and 1033 ppm (UHC). The point shown at 936 ppm (circle) is the calculated solution concentration needed to meet the design target of OD=1.9-2.1 at 491 nm, calculated using HC data.

FIG. 2 shows the peak optical density for Trilogy™ Trivex™-based lenses tinted with Exciton P-491 in a 1:4 $CH_2Cl_2$:$CH_3OH$ (vol:vol) solution at three different concentrations. Example 2A (diamonds) was tinted with a concentration of 114 ppm dye in solution (LC), Example 2B (squares) was tinted with a concentration of 559 ppm (HC) and Example 2C (triangles) was tinted with a concentration of 1033 ppm (UHC). A concentration of 936 ppm dye (circle) in solution is calculated to yield the target OD for P-491 dye in the fully-loaded test (see Table V-A).

Figure 3:
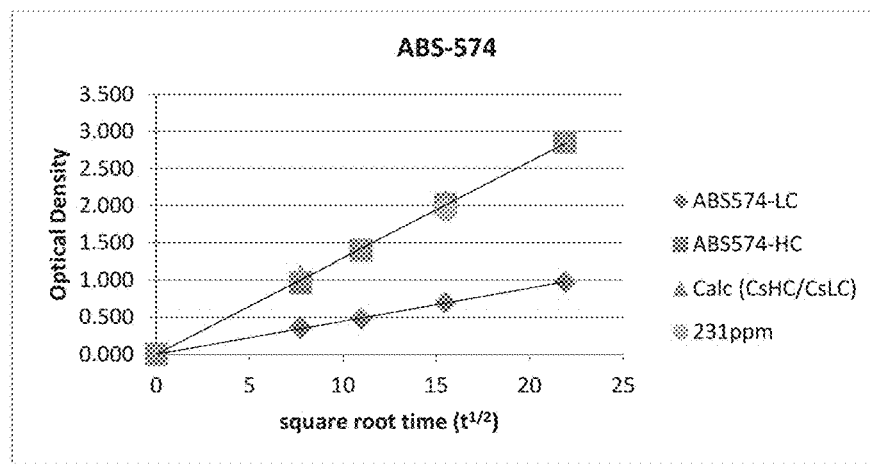
FIG. 3 shows optical density versus square root of time for Examples 3A-3B: tinting Trivex™-based lenses with ABS-574 in a 1:4 $CH_2Cl_2:CH_3OH$ solution with concentrations of 116 ppm (LC) and 338 ppm (HC). The point shown at 231 ppm (circle) is the calculated solution concentration needed to meet the design target of OD=1.2-1.4 at 574 nm, calculated using HC data. Calc (CsHC/CsLC) is calculated data and is explained in the detailed description.

FIG. 3 shows the peak optical density for Trilogy™ Trivex™-based lenses tinted with Exciton ABS-574 in a 1:4 $CH_2Cl_2$:$CH_3OH$ (vol:vol) solution at two different concentrations. Example 3A (diamonds) was tinted with a concentration of 116 ppm dye in solution (LC) and Example 3B (squares) was tinted with a concentration of 559 ppm (HC). A concentration of 231 ppm dye (circle) in solution is calculated to yield the target OD for ABS-574 dye in the fully-loaded test (see Table V-A).

Figure 4:
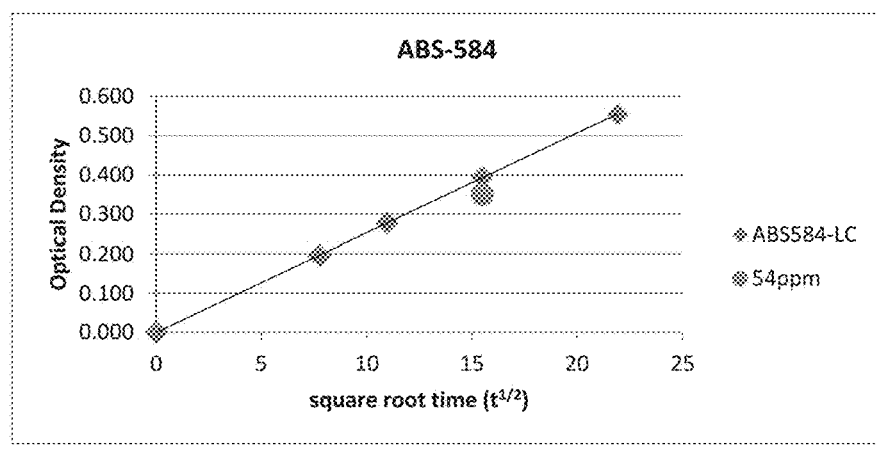
FIG. 4 shows optical density versus square root of time for Example 4A: tinting Trivex™-based lenses with ABS-584 in a 1:4 $CH_2Cl_2:CH_3OH$ solution with a concentration of 61 ppm (LC). The point shown at 54 ppm (circle) is the calculated solution concentration needed to meet the design target of OD=0.25-0.35 at 584 nm, calculating using HC data.

FIG. 4 shows the peak optical density for Trilogy™ Trivex™-based lenses tinted with Exciton ABS-584 in a 1:4 $CH_2Cl_2$:$CH_3OH$ (vol:vol) solution at one concentration. Example 4A (diamonds) was tinted with a concentration of 61 ppm dye in solution (LC). A concentration of 54 ppm dye (circle) in solution is calculated to yield the target OD for ABS-584 dye in the fully-loaded test (see Table V-A).

Figure 5:
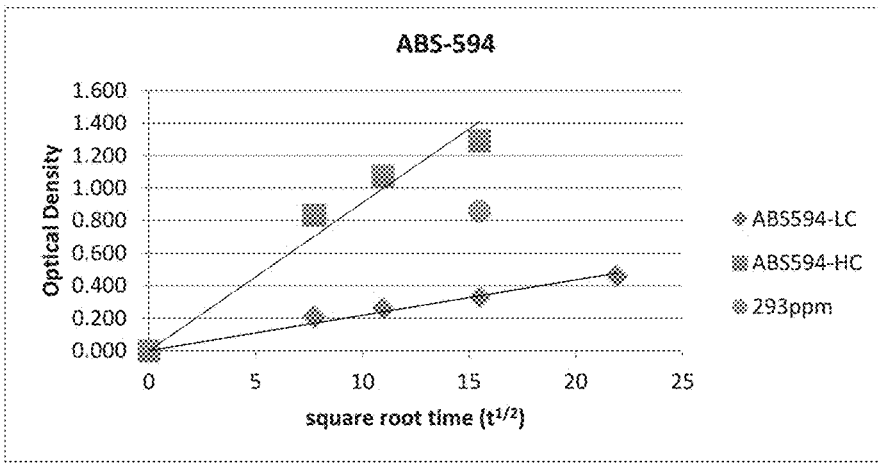
FIG. 5 shows optical density versus square root of time for Examples 5A-5B: tinting Trivex™-based lenses with ABS-594 in a 1:4 $CH_2Cl_2:CH_3OH$ solution with concentrations of 109 ppm (LC) and 442 ppm (HC). The point shown at 293 ppm (circle) is the calculated solution concentration needed to meet the design target of OD=0.7-0.9 at 594 nm, calculated using HC data.

FIG. 5 shows the peak optical density for Trilogy™ Trivex™-based lenses tinted with Exciton ABS-594 in a 1:4 $CH_2Cl_2$:$CH_3OH$ (vol:vol) solution at two different concentrations. Example 5A (diamonds) was tinted with a concentration of 109 ppm dye in solution (LC) and Example 5B (square) was tinted with a concentration of 442 ppm (HC). A concentration of 293 ppm dye (circle) in solution is calculated to yield the target OD for ABS-594 dye in the fully-loaded test (see Table V-A).

Figure 6:
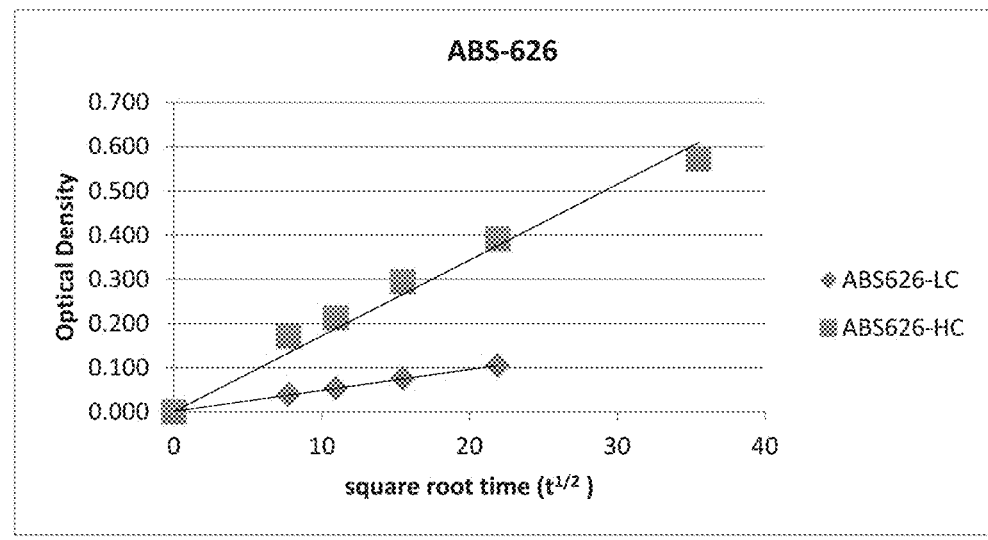
FIG. 6 shows optical density versus square root of time for Examples 6A-6B: tinting Trivex™-based lenses with ABS-626 in a 1:4 CH$_2$Cl$_2$:CH$_3$OH solution with concentrations of 154 ppm (LC) and 1528 ppm (HC).

FIG. 6 shows the peak optical density for Trilogy™ Trivex™-based lenses tinted with Exciton ABS-626 in a 1:4 $CH_2Cl_2$:$CH_3OH$ (vol:vol) solution at two different concentrations. Example 6A (diamonds) was tinted with a concentration of 154 ppm dye in solution (LC), and Example 6B (squares) was tinted with a concentration of 1528 ppm (HC).

Figure 7:
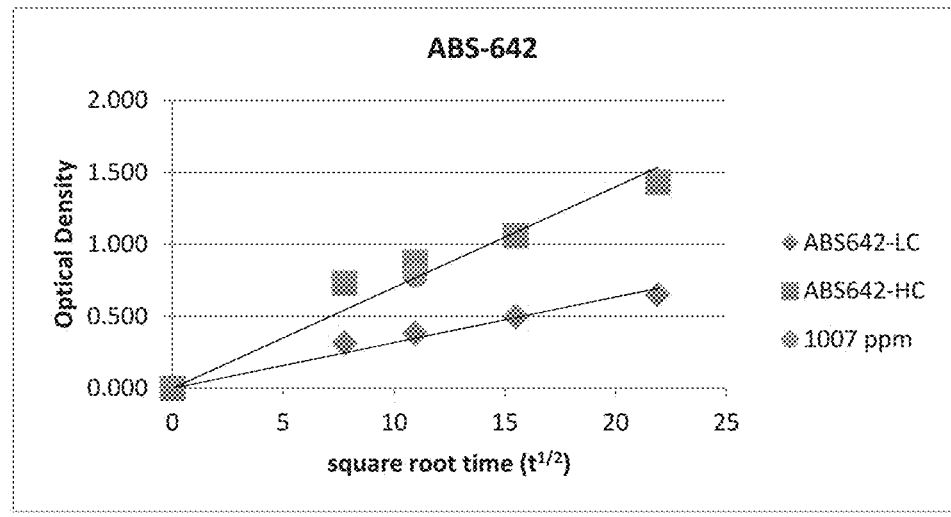
FIG. 7 shows optical density versus square root of time for Examples 7A-7B: tinting Trivex™-based lenses with ABS-642 in a 1:4 CH$_2$Cl$_2$:CH$_3$OH solution with 454 ppm (LC) and 1117 ppm (HC). The point shown at 1007 ppm (circle) is the calculated solution concentration needed to meet the design target of OD=0.4-0.6 at 642 nm, calculated using HC data.

FIG. 7 shows the peak optical density for Trilogy™ Trivex™-based lenses tinted with Exciton ABS-642 in a 1:4 $CH_2Cl_2$:$CH_3OH$ (vol:vol) solution at two different concentrations. Example 7A (diamonds) was tinted with a concentration of 454 ppm dye in solution (LC), and Example 7B (squares) was tinted with a concentration of 1117 ppm (HC). A concentration of 1007 ppm dye (circle) in solution is calculated to yield the target OD for ABS-642 dye in the fully-loaded test (see Table V-A).

Figure 8:
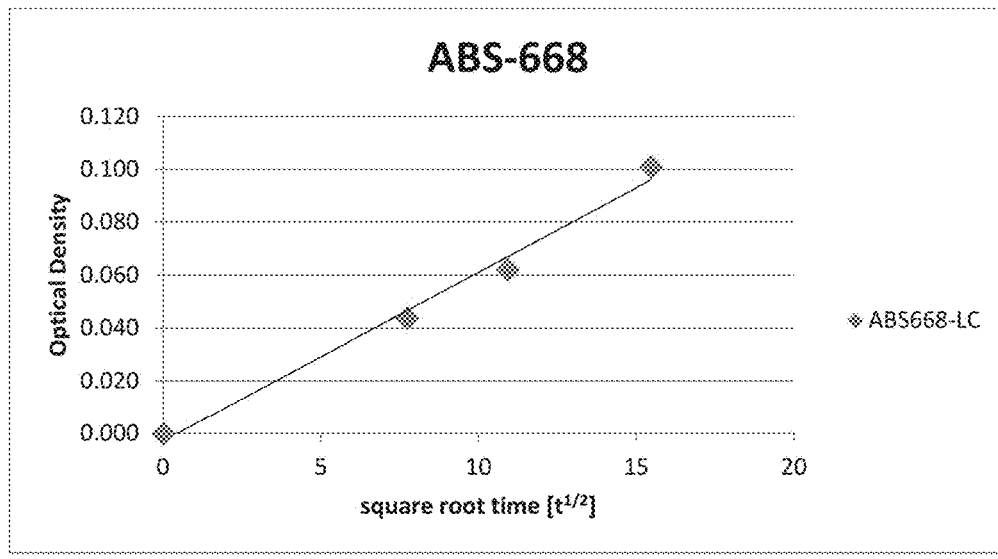
FIG. 8 shows optical density versus square root of time for Example 8A: tinting Trivex™-based lenses with ABS-668 in a 1:4 CH$_2$Cl$_2$:CH$_3$OH solution with 109 ppm (LC)
Figure 9A:
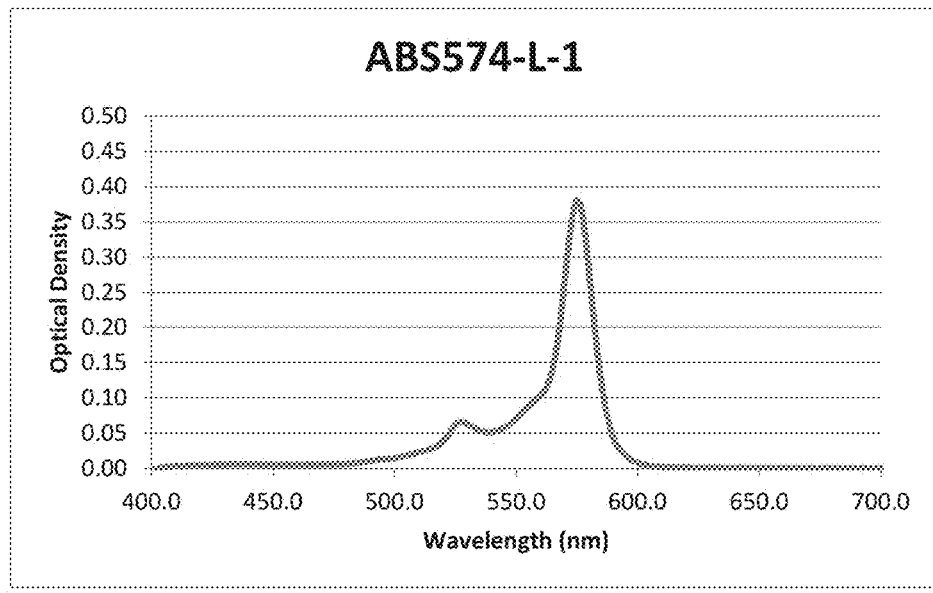
FIG. 9-A shows spectral scan of Example 3A: Trivex™ lens held for 60 s in low-concentration tinting bath. Optical density is measured at wavelength of peak absorption.
Figure 9B:
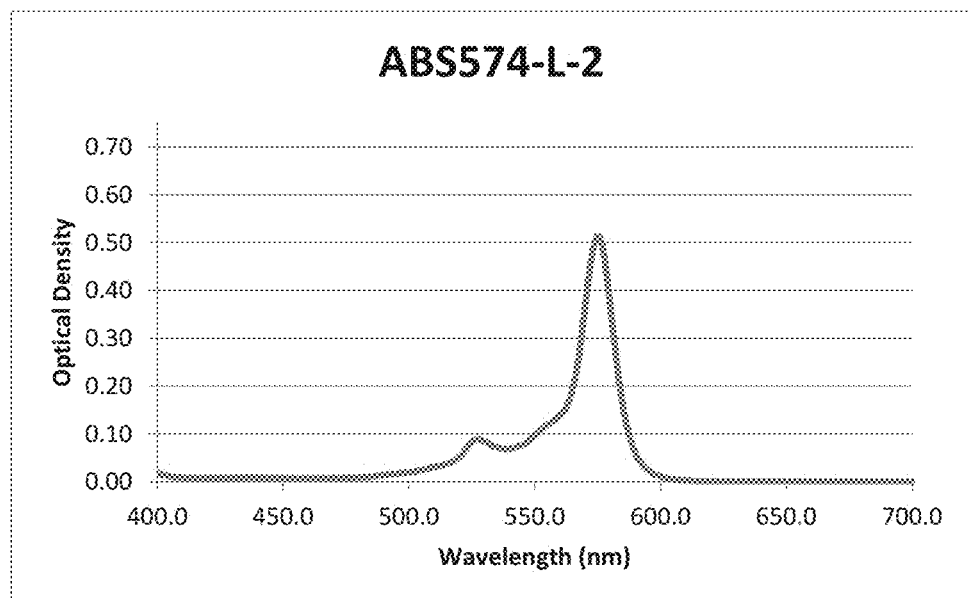
Figure 9C:
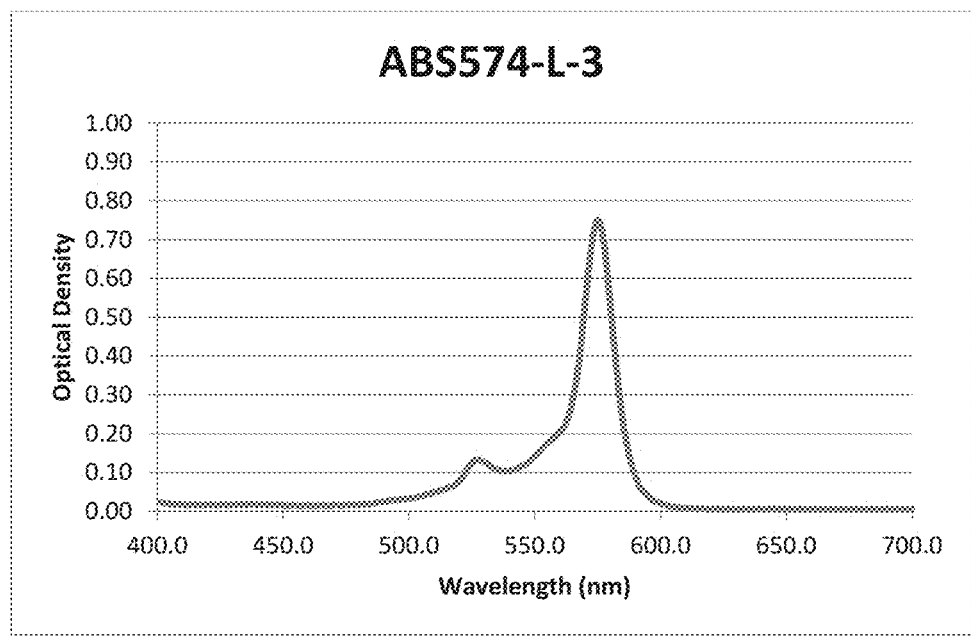
Figure 9D:
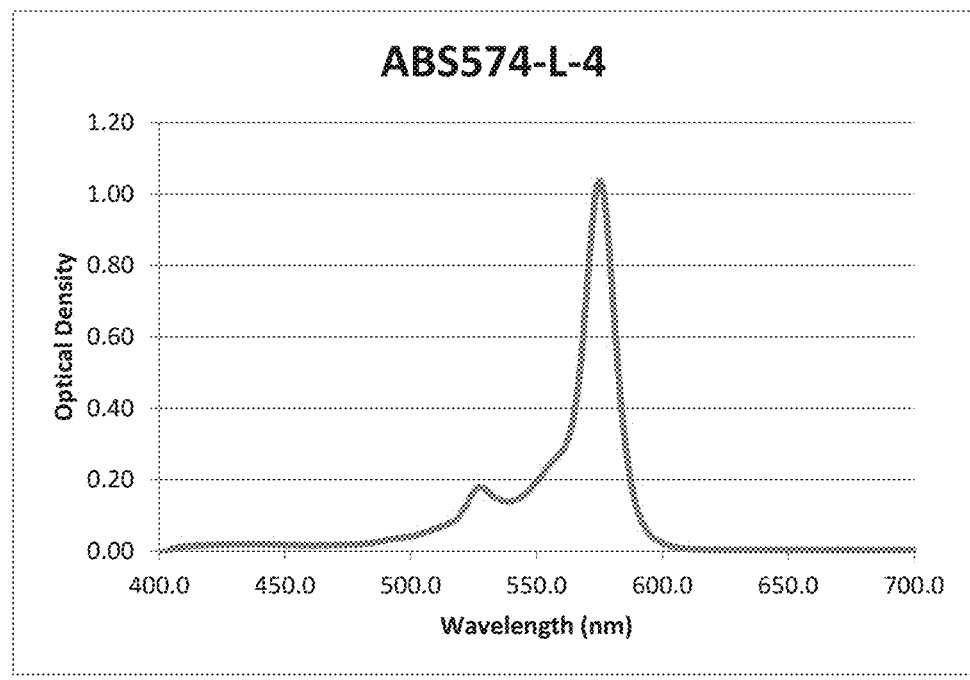
Figure 9E:
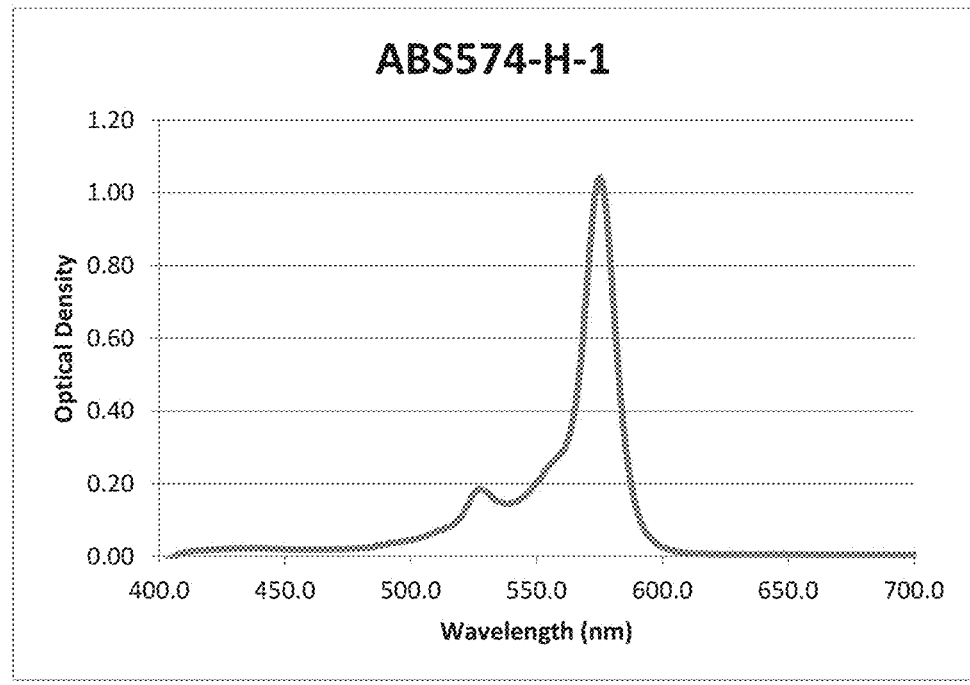
Figure 9F:
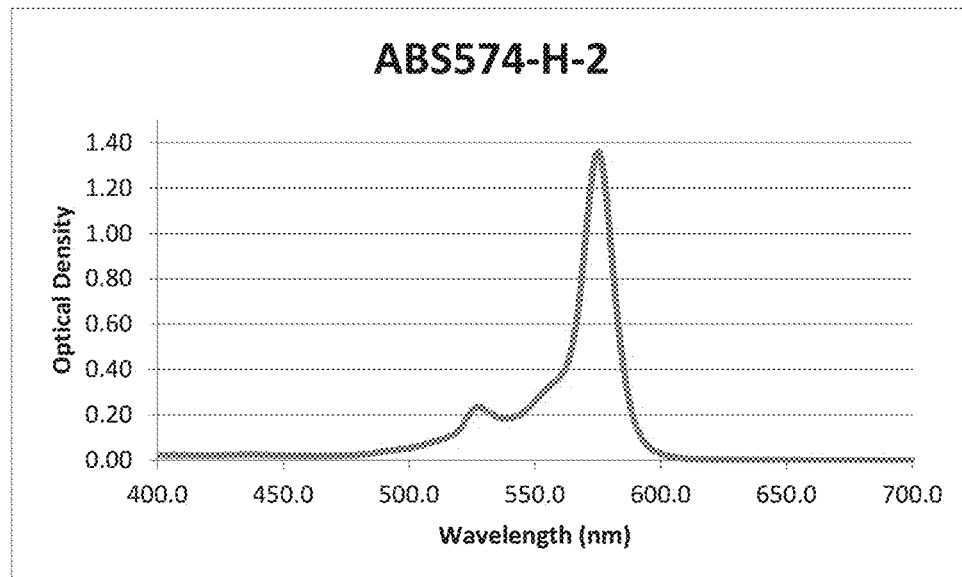
Figure 9G:
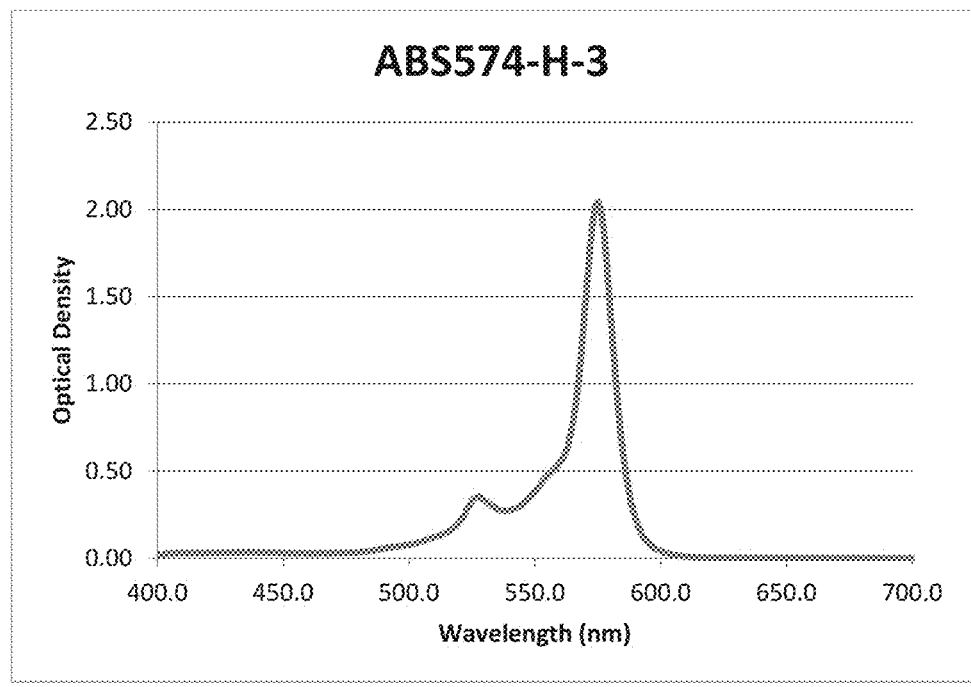
Figure 9H:
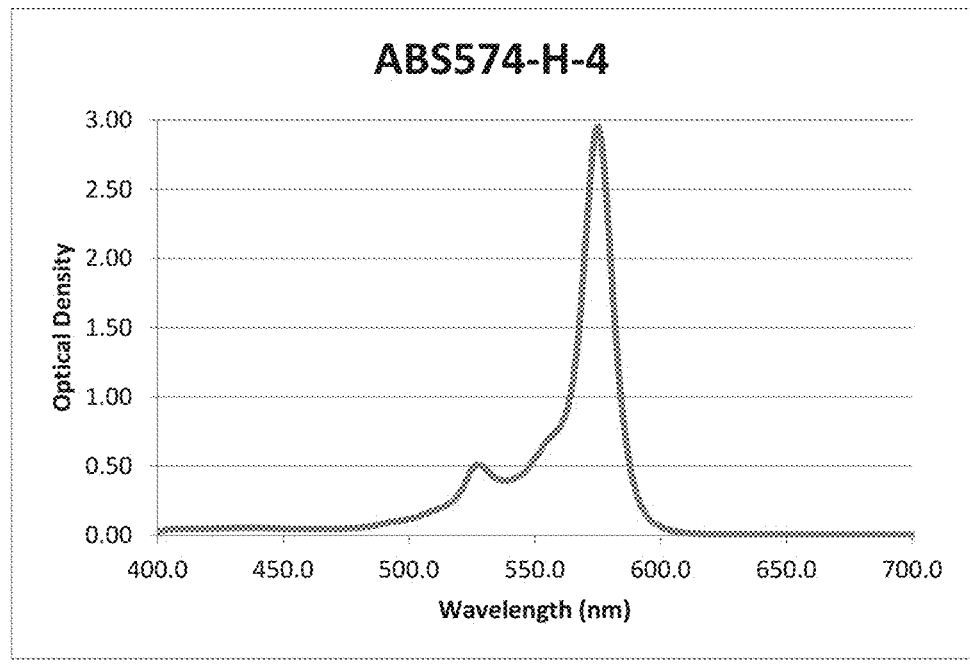

FIG. 8 shows the peak optical density for Trilogy™ Trivex™-based lenses tinted with Exciton ABS-668 in a 1:4 $CH_2Cl_2$:$CH_3OH$ (vol:vol) solution at two different concentrations. Example 8A (diamonds) was tinted with a concentration of 109 ppm dye in solution (LC).

Single Dye Diffusion Studies for Tinting

Measurement of absorbance versus wavelength yield optical density values at peak absorbance. Spectral data were collected for Examples 1A-8A, including LC, HC and UHC examples of each dye species studied and are compiled in FIGS. 1 through 8. Except for ABS-574, the spectral data are not shown. As shown in FIGS. 1-8, as the time of exposure to the dye in the tinting bath progresses, the optical density increases linearly with square root of time, indicative of type-I diffusion (Fickian).

FIGS. 9A-9H show spectral data for the tinting study using ABS-574 dye in low- and high-concentration baths and tinting times from 60 seconds to 480 seconds (Examples 3A-3B). FIG. 3 shows this data summarized as peak optical density as a function of square root of time in the tinting bath.

FIG. 3 also shows that optical density is linear with dye bath concentration. The data set labeled Calc (CsHC/CsLC) is calculated data in which the low concentration data is multiplied by the factor 'OD at high concentration divided by the OD at low concentration'. The fit is perfect. The data show that the diffusion controlled OD is a function of the square root of time in the tinting bath, and also that the OD was linear with solution concentration over the range tested. This was verified by multiplying the LC data points by a factor equal to the solution concentration in the HC bath divided by the solution concentration in the LC bath. The LC data could be made to fit the HC data by multiplying the LC data by the concentration ratio.

The following Equations 5-12 are the governing equations used to determine dye concentrations ($C_s$) and tint time (t) to achieve a desired optical density at a wavelength $\lambda$. For Equations 5-12, $C_s$ is in ppm based on mass of dye in total mass of dye and solution, t is in seconds, and $\lambda$ is in nanometers. $OD_\lambda(C_s,t)$ represents the optical density at $\lambda$ in the tinted lens, which is a function of dye concentration. $C_{s,\lambda}(OD,t)_{target}$ represents the target dye concentration needed to achieve a desired OD in a tinting time t. $OD_\lambda(C_s,t)$ represents the optical density achieved using a tinting concentration of $C_s$ and a tinting time t.

$$OD_{473}(C_s,t)=5.2C_s\sqrt{t} \quad C_{s,473}(OD,t)_{target}=OD_{473}(C_s,t)/(5.2\sqrt{t}) \quad \text{Eq. 5}$$

$$OD_{491}(C_s,t)=1.8C_s\sqrt{t} \quad C_{s,491}(OD,t)_{target}=OD_{491}(C_s,t)/(1.8\sqrt{t}) \quad \text{Eq. 6}$$

$$OD_{574}(C_s,t)=5.1C_s\sqrt{t} \quad C_{s,574}(OD,t)_{target}=OD_{574}(C_s,t)/(5.1\sqrt{t}) \quad \text{Eq. 7}$$

$$OD_{584}(C_s,t)=1.6C_s\sqrt{t} \quad C_{s,584}(OD,t)_{target}=OD_{584}(C_s,t)/(1.6\sqrt{t}) \quad \text{Eq. 8}$$

$$OD_{594}(C_s,t)=2.3C_s\sqrt{t} \quad C_{s,594}(OD,t)_{target}=OD_{594}(C_s,t)/(2.3\sqrt{t}) \quad \text{Eq. 9}$$

$$OD_{626}(C_s,t)=0.7C_s\sqrt{t} \quad C_{s,626}(OD,t)_{target}=OD_{626}(C_s,t)/(0.7\sqrt{t}) \quad \text{Eq. 10}$$

$$OD_{642}(C_s,t)=13.5C_s\sqrt{t} \quad C_{s,642}(OD,t)_{target}=OD_{542}(C_s,t)/(13.5\sqrt{t}) \quad \text{Eq. 11}$$

$$OD_{668}(C_s,t)=1.2C_s\sqrt{t} \quad C_{s,668}(OD,t)_{target}=OD_{668}(C_s,t)/(1.2\sqrt{t}) \quad \text{Eq. 12}$$

Where, as an example, in Eq. 5, $C_{s,473}$ is the concentration of dye in the solvent solution for ABS-473 tinting. The governing equations indicate that the optical density is linear with the square root of time and concentration of dye in solution. From this we can determine the correct dye level required for a given target OD and process time.

TABLE III

Dye concentrations required to meet target OD values for a "theoretical Cx-14 like" filter, with process times of 120 and 240 s and at 20° C. Cx-14 refers to the standard Cx sunglass color enhancing lens for colorblindness, manufactured by EnChroma, Inc. (Berkeley, CA).

| Dye species | Target OD | $C_s$ [ppm] (t = 120 s) | $C_s$ [ppm] (t = 240 s) |
|---|---|---|---|
| ABS-473 | 2.115 | 444.8 | 314.5 |
| P-491 | 2.942 | 1924.1 | 1360.6 |
| ABS-574 | 1.594 | 378.3 | 267.5 |
| ABS-584 | 0.281 | 62.0 | 43.8 |
| ABS-594 | 0.776 | 367.1 | 259.6 |
| ABS-626 | 0.78 | 2303 | 1608 |

Example 9: Co-Diffusion Study (Multiple Dyes for Tinting)

A test was made with a fully loaded dye bath comprising 6 different types of dyes to achieve a complex absorption spectrum that can enhance color for color blindness. The design was made to approximate the absorption spectrum of the Cx-25™ (EnChroma's 25% VLT sunglass lens). The main purpose of this experiment was to test dye compatibility for a fully-loaded bath, and to see how closely optical densities can be calculated from dye concentrations in the fully-loaded system. Table V-A lists target optical densities for each dye, their peak wavelength determined from earlier work, the dye concentration in mass weight and ppm.

TABLE V-A

Target OD for each dye in the fully-loaded test.

| Dye species | Target OD | Conc [g] | Conc [ppm] |
|---|---|---|---|
| ABS-473 | 0.89-0.91 | 0.060 | 129 |
| P-491 | 1.9-2.1 | 0.435 | 935 |
| ABS-574 | 1.2-1.4 | 0.107 | 230 |
| ABS-584 | 0.25-0.35 | 0.025 | 54 |
| ABS-594 | 0.7-0.9 | 0.136 | 292 |
| ABS-642 | 0.4-0.6 | 0.468 | 1006 |

TABLE V-B

Fully loaded (6 Exciton dyes) tinting bath with dye concentrations.

| Component | Volume [ml] | Weight [g] | Conc [ppm] | $\lambda_{pk}$ [nm]/Optical Density | |
|---|---|---|---|---|---|
| | | | | Tinting time [s] | |
| | | | | 120 | 240 |
| CH$_2$Cl$_2$ | 100.0 | 132.7 | | | |
| CH$_3$OH | 400.0 | 316.7 | | | |
| ABS-473 | | 0.060 | 129 | 477/1.16 | 477/1.46 |
| P-491 | | 0.435 | 935 | 492/2.26 | 492/2.76 |
| ABS-574 | | 0.107 | 230 | 575/1.34 | 575/1.80 |
| ABS-584 | | 0.025 | 54 | 584/1.13 | 584/1.49 |
| ABS-594 | | 0.136 | 292 | 594/1.06 | 594/1.36 |
| ABS-642 | | 0.468 | 1006 | 642/0.83 | 642/01.04 |

TABLE VI

Spectroscopy data used to determine concentrations and absorption coefficients in Table V. The dye wt. (g) is the weight of dye in the dye solvent master (dSM). Some weight of dye solvent master dSM (g) is diluted with dye-free solvent master SM (g) to arrive at the dye conc. (ppm) contained in the cuvette. The spectroscopy yields the dominant wavelength λ [nm] and optical density OD.

|  | ABS473 | P491 | ABS574 | ABS584 | ABS594 | ABS626 | ABS642 |
|---|---|---|---|---|---|---|---|
| dye wt. [$\times 10^{-4}$ g] | 1.461 | 1.543 | 0.5411 | 0.4830 | 0.9284 | 2.904 | 1.787 |
| dSM [g] | 0.33 | 0.18 | 0.16 | 0.79 | 0.21 | 0.19 | 0.16 |
| SM [g] | 9.13 | 13.28 | 7.94 | 8.13 | 8.70 | 8.42 | 13.28 |
| dye conc. [ppm] | 15.4 | 11.5 | 6.7 | 5.4 | 10.4 | 33.7 | 13.3 |
| λ [nm] | 474 | 489 | 572 | 581 | 592 | 628 | 637 |
| OD | 1.943 | 3.883 | 1.113 | 1.263 | 2.159 | 2.328 | 3.639 |

TABLE VII

Calculated absorption coefficients for dye species in 1:4 $CH_2Cl_2$:$CH_3OH$ solvent solution. Data taken from Table VI.

| Dye Species | OD | Concentration [ppm] | Abs. coeff. [ppm$^{-1}$ cm$^{-1}$] |
|---|---|---|---|
| ABS473 | 1.943 | 15.4 | 0.1261 |
| P491 | 3.883 | 11.5 | 0.3376 |
| ABS574 | 1.113 | 6.7 | 0.1661 |
| ABS584 | 1.263 | 5.4 | 0.2338 |
| ABS594 | 2.159 | 10.4 | 0.2076 |
| ABS626 | 2.328 | 33.7 | 0.0691 |
| ABS642 | 3.639 | 13.3 | 0.2735 |

The absorption coefficients in Table VII are calculated from the measured optical density, calculated dye concentration and cuvette path length, using the Beer-Lambert equation (Eq. 13).

$$\alpha = (-1/C_s X_L)\ln(10^{-OD}) \qquad \text{Eq. 13}$$

where
α is the absorption coefficient,
$C_s$ are the concentrations given in Table VII,
$X_L$ is cuvette path length and
OD is the measured optical density.

Figure 10A:
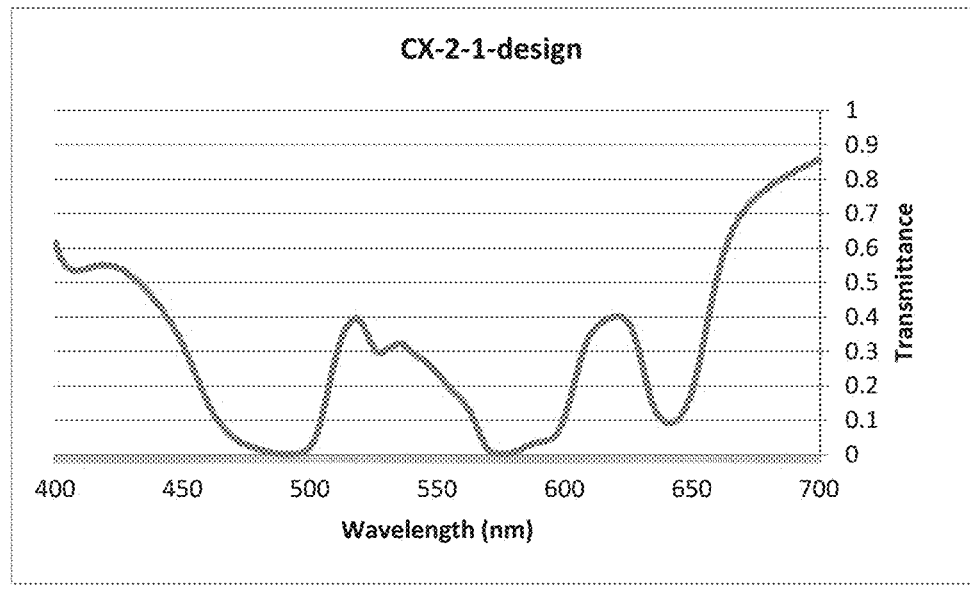
FIG. 10A shows spectral design target for EnChroma's Cx-25 eyewear constructed from a linear combination of dyes, designed for immersion in the tinting solution for 240 s at 20° C.
Figure 10B:
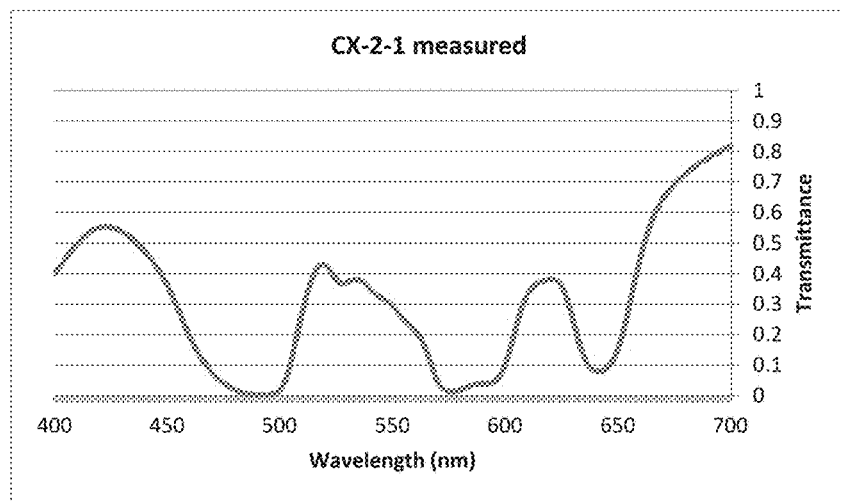
FIG. 10B shows measured spectra for Example 9, tinted in a solution comprising 6 Exciton narrowband absorber dyes for 240 seconds at 20° C. The combination of dyes is selected to match EnChroma's Cx-25 vision enhancing eyewear.

By combining this data as weighted linear combinations of the dye spectral profiles theoretical spectra can be constructed (FIG. 10A). This concept and its underlying model of swelling and diffusion hinges on how well this can be matched with actual measured data. FIG. 10B shows the actual tinting experiment for Example 9, where a Trilogy™ Trivex™-based lens with its hard coat removed as described in Examples 1A-8A above, was held for 240 s at 20° C. in a tinting bath with dye concentration shown in Table VII. Visually, the collected data is indistinguishable from the modeled spectra except at wavelengths around 700 nm, where the eye is very insensitive to light. A spectral comparison shows that the difference between design and measured is less than 0.05 OD units, typically less than 0.01 OD units. Note that OD, or optical density is the negative logarithm of transmittance. In practice the eye can only detect changes in chromatic value or in luminance if it is larger than the Weber fraction (Steven's law). In the case for light intensity the Weber fraction is 0.08.

Examples 10A-10B: Contact Lens Tinting

Bausch & Lomb's Pure Vision™ contact lenses were tinted with narrowband absorber dyes using the methods described herein.

For Example 10A, a contact lens was tinted for 90 minutes with the dye solution as described for Example 9 (Cx-25, V.2 solution), excluding the step of removing the hard coat. The contact lens was rinsed with methanol and oven dried prior to immersion in the tinting solution. For Example 10B, a contact lens was tinted with Exciton ABS-574 (HC) as described for Example 3B. In this Example 10B, the lens was transferred directly from the manufacturer's contact lens solution to the tinting solution, and back again after sufficient time.

Figure 11:
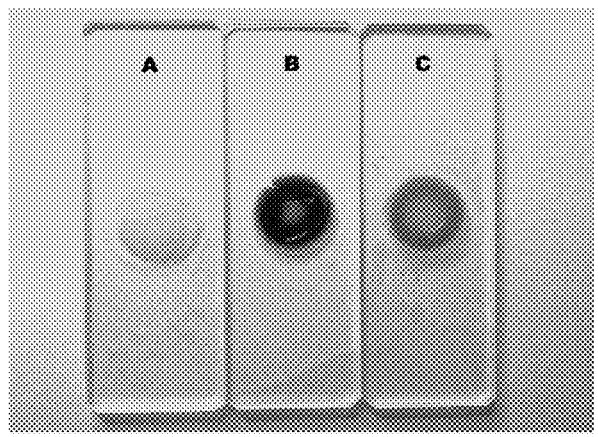
FIG. 11 shows contact lenses ready for spectroscopy. The lenses are sandwiched between concave welled microscope slides containing lens solution: (A) as received lens, (B) Example 10A: lens tinted for 90 minutes with Cx-25, V.2 solution and (C) Example 10B: lens tinted for 60 minutes with ABS-574 (HC).

FIG. 11 shows the contact lenses ready for spectroscopy. The lenses are sandwiched between concave welled microscope slides containing lens solution. FIG. 11(A) shows the as received lens, FIG. 11(B) shows Example 10A, a lens tinted for 90 minutes with the dye solution described for Example 9 (Cx-25, V.2 solution) and FIG. 11(C) shows Example 10B, a lens tinted for 60 minutes with ABS-574 (HC).

Figure 12:
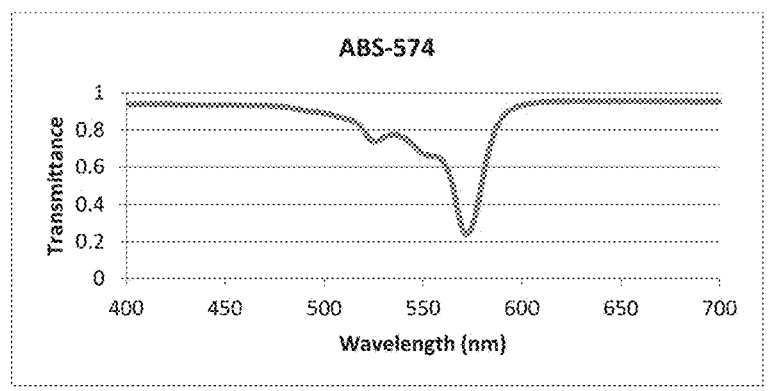
FIG. 12 shows a spectral scan of Example 10B: contact lens tinted for 60 minutes in high concentration (HC) dye solution ABS-574.
Figure 13:
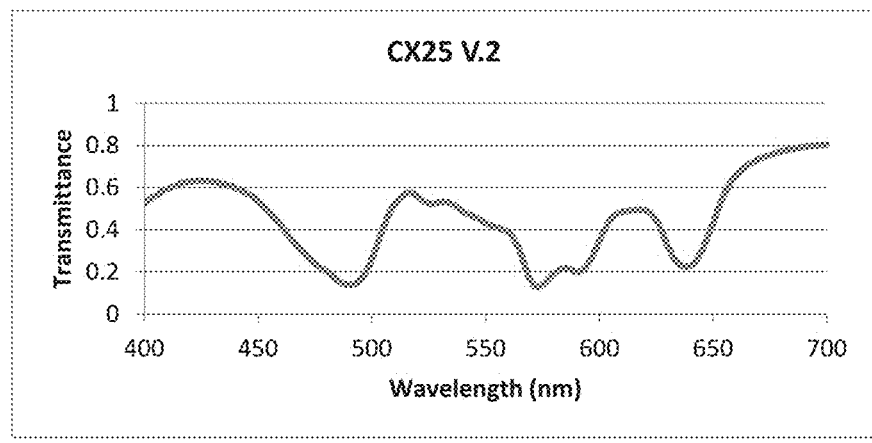
FIG. 13 shows a spectral scan of Example 10A: contact lens tinted for 90 minutes in dye solution CX-25 V.2.

FIG. 12 shows the spectral scan of Example 10B, a contact lens tinted for 60 minutes in dye solution ABS-574. FIG. 13 show the spectral scan of Example 10A, a contact lens tinted for 90 minutes in dye solution CX-25 V.2. Measurements made with a Cary 5E spectrophotometer.

As observed for Examples 10A-10B, Bausch &Lomb PureVision™ did accept dye. The lens showed signs of deterioration, in the form of a torn edge (FIG. 11B). The torn edge is believed to be due to the drying method used. By skipping the intermediate methanol rinse and oven drying steps, and transferring the lens from the contact lens solution directly to the dye solution lens integrity was preserved. (FIG. 11C).

Ciba Vision contact lenses did not take dye under conditions tested as described for Examples 10A-10B.

The diffusion coefficients of Exciton dye species in methanol-methylene chloride solution is lower valued for diffusion into silicone hydrogels than for the Trivex™-based lenses tested, under the conditions tested.

This disclosure is illustrative and not limiting. Further modifications will be apparent to one skilled in the art in light of this disclosure. For example, where methods and steps described above indicate certain events occurring in certain order, those of ordinary skill in the art will recognize that the ordering of certain steps may be modified and that such modifications are in accordance with the inventions disclosed herein. Additionally, certain of the steps may be performed concurrently in a parallel process when possible, as well as performed sequentially as described above. Acts referred to herein as operations in a method or process may also be understood as "steps" in the method or process. Therefore, to the extent there are variations of the inventions disclosed herein, which are within the spirit of this disclosure or equivalent to the inventions disclosed herein, it is the intent that this disclosure and the claims it supports will cover those variations as well. All publications and patent applications cited in this disclosure are incorporated herein by reference in their entirety as if each individual publication or patent application were specifically and individually put forth herein.

What is claimed is:

1. A method for making an optical filter, the method comprising:

diffusing multiple dyes dissolved in a solvent into a transparent polymeric substrate at a tinting temperature, at least one of the dyes being a narrowband absorber dye; and removing the solvent, wherein the solvent is selected to sufficiently swell the polymeric substrate to facilitate diffusion of the dyes into the substrate to tint the substrate, and so that the substrate sufficiently recovers its original volume and shape so that the substrate is compatible with ophthalmic lens use following removal of the solvent, trapping the dyes in the substrate, and the dyes and their relative amounts are selected so that the tinted substrate exhibits an absorption spectrum useful for enhancing color vision.

2. The method of claim 1, wherein the solvent is non-aqueous.

3. The method of claim 1, wherein the tinting temperature is about 30° C. or less.

4. The method of claim 2, wherein the tinting temperature is about 30° C. or less.

5. The method of claim 1, comprising diffusing multiple narrowband absorber dyes into the substrate.

6. The method of claim 2, comprising diffusing multiple narrowband absorber dyes into the substrate.

7. The method of claim 3, comprising diffusing multiple narrowband absorber dyes into the substrate.

8. The method of claim 4, comprising diffusing multiple narrowband absorber dyes into the substrate.

9. The method of claim 1, wherein the polymeric substrate comprises a polyurethane.

10. The method of claim 2, wherein the polymeric substrate comprises a polyurethane.

11. The method of claim 3, wherein the polymeric substrate comprises a polyurethane.

12. The method of claim 4, wherein the polymeric substrate comprises a polyurethane.

13. The method of claim 5, wherein the polymeric substrate comprises a polyurethane.

14. The method of claim 6, wherein the polymeric substrate comprises a polyurethane.

15. The method of claim 7, wherein the polymeric substrate comprises a polyurethane.

16. The method of claim 8, wherein the polymeric substrate comprises a polyurethane.

17. The method of claim 1, wherein the polymeric substrate comprises an organosilicon polymer.

18. The method of claim 2, wherein the polymeric substrate comprises an organosilicon polymer.

19. The method of claim 3, wherein the polymeric substrate comprises an organosilicon polymer.

20. The method of claim 4, wherein the polymeric substrate comprises an organosilicon polymer.

21. The method of claim 5, wherein the polymeric substrate comprises an organosilicon polymer.

22. The method of claim 6, wherein the polymeric substrate comprises an organosilicon polymer.

23. The method of claim 7, wherein the polymeric substrate comprises an organosilicon polymer.

24. The method of claim 8, wherein the polymeric substrate comprises an organosilicon polymer.

* * * * *